(12) United States Patent
Chang et al.

(10) Patent No.: US 11,853,661 B2
(45) Date of Patent: Dec. 26, 2023

(54) SYSTEMS AND METHODS FOR MACHINE LEARNING BASED FAST STATIC THERMAL SOLVER

(71) Applicant: ANSYS, INC., Canonsburg, PA (US)

(72) Inventors: Norman Chang, Fremont, CA (US); Hsiming Pan, San Jose, CA (US); Jimin Wen, Pleasanton, CA (US); Deqi Zhu, San Jose, CA (US); Wenbo Xia, Milpitas, CA (US); Akhilesh Kumar, Milpitas, CA (US); Wen-Tze Chuang, Yilan County (TW); En-Cih Yang, New Taipei (TW); Karthik Srinivasan, Cupertino, CA (US); Ying-Shiun Li, Pleasanton, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/664,241

(22) Filed: May 20, 2022

(65) Prior Publication Data
US 2022/0277120 A1 Sep. 1, 2022

Related U.S. Application Data

(62) Division of application No. 16/709,746, filed on Dec. 10, 2019, now Pat. No. 11,366,947.

(51) Int. Cl.
*G06F 30/27* (2020.01)
*G06F 119/08* (2020.01)
*G06F 113/18* (2020.01)

(52) U.S. Cl.
CPC .......... *G06F 30/27* (2020.01); *G06F 2113/18* (2020.01); *G06F 2119/08* (2020.01)

(58) Field of Classification Search
USPC .......................................................... 703/2
See application file for complete search history.

(56) References Cited

U.S. PATENT DOCUMENTS

2009/0019411 A1* 1/2009 Chandra ............... G06F 30/367
716/119
2016/0249487 A1* 8/2016 Bhagwat ............ H05K 7/20745

OTHER PUBLICATIONS

Ahmed Al-Jarro, Yasumoto Tomita, Serban Georgescu, Kouta Nakashima, "DeepSim-HiPAC: Deep Learning High Performance Approximate Calculation for Interactive Design and Prototyping", The International Conference for High Performance Computing, Networking, Storage, and Analysis, SC'18, Nov. 2018, Dallas, TX, USA, 3 pages.

* cited by examiner

*Primary Examiner* — Bryce M Aisaka
(74) *Attorney, Agent, or Firm* — Womble Bond Dickinson (US) LLP

(57) ABSTRACT

Machine assisted systems and methods for enhancing the resolution of an IC thermal profile from a system analysis are described. These systems and methods can use a neural network based predictor, that has been trained to determine a temperature rise across an entire IC. The training of the predictor can include generating a representation of two or more templates identifying different portions of an integrated circuit (IC), each template associated with location parameters to position the template in the IC; performing thermal simulations for each respective template of the IC, each thermal simulation determining an output based on a power pattern of tiles of the respective template, the output indicating a change in temperature of a center tile of the respective template relative to a base temperature of the integrated circuit; and training a neural network. The trained predictor can be used to determine a temperature rise and then can be appended to a system level thermal profile of the IC to generate a detailed thermal profile of the IC.

14 Claims, 20 Drawing Sheets

Inferencing using the Temperature Rise (DeltaT) Predictor models

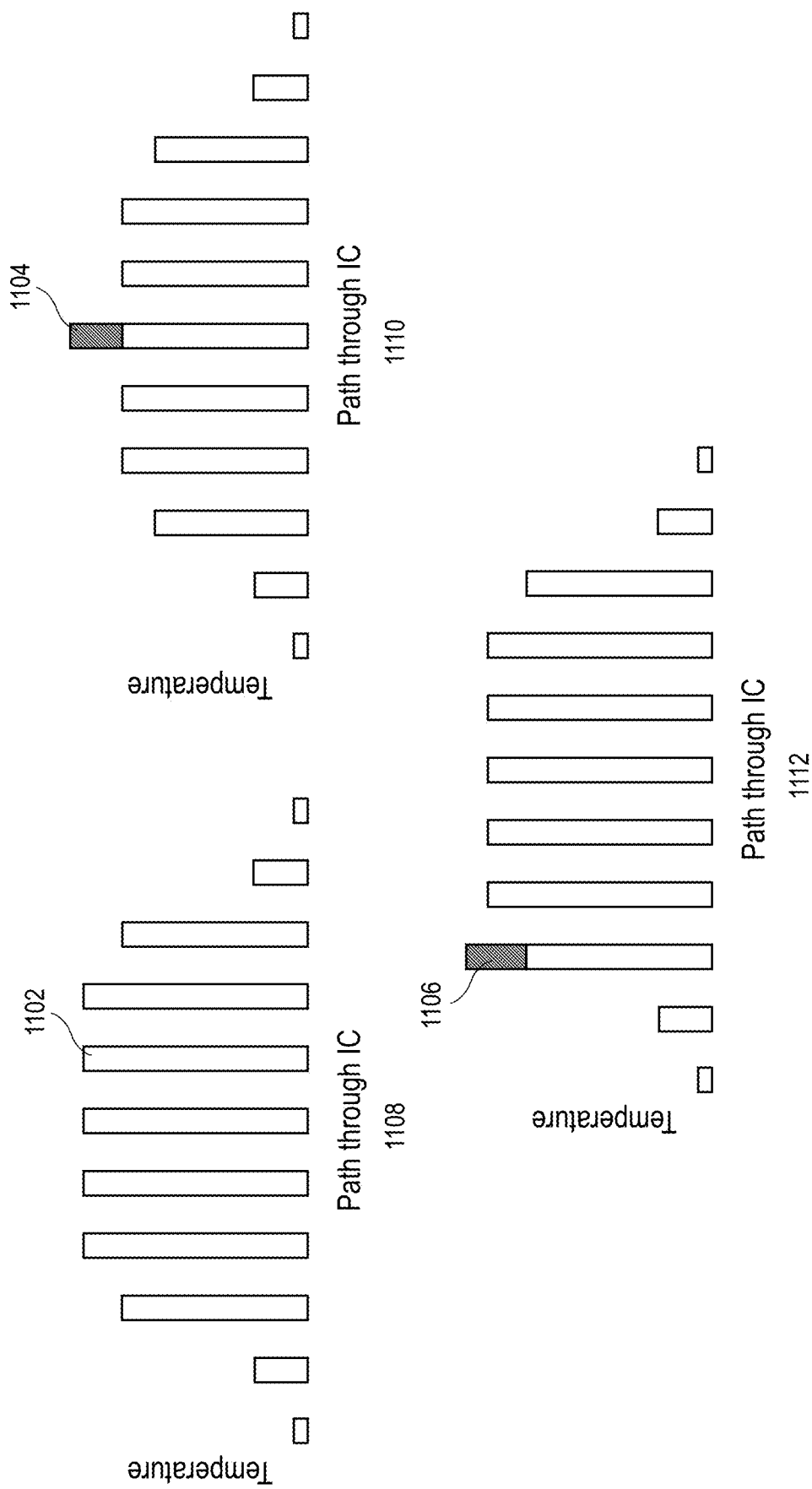

SYSTEMS AND METHODS FOR MACHINE LEARNING BASED FAST STATIC THERMAL SOLVER

This application is a divisional of co-pending U.S. application Ser. No. 16/709,746 filed on Dec. 10, 2019, which is incorporated herein by reference.

BACKGROUND

Accurate thermal gradient on an integrated circuit (IC) is important for an efficient and a predictable IC-package-system performance and reliability. There are usually maximum temperature, $T_{max}$ constraint on junction on-IC, skin $T_{max}$ of IC-package, and also placement of on-IC thermal sensor for DVFS (Dynamic Voltage and Frequency Control) design technique. Temperatures on IC also directly impact electromigration, voltage drop, and timing. A system thermal analysis model may need to cover many important parts of the system for the complete thermal environment, including ICs, packages, other heating components on PCB's, surrounding air volumes, fans, and chassis. Because of the coarse mesh on the IC, the resolution of thermal profile is often lower than the standard for evaluating the reliability of devices and wires in each IC. Specifically, when the detailed power map of an IC being applied to the coarse mesh of an IC, the results may be smeared and gives inaccurate temperature gradient of the IC.

Obtaining a highly accurate and detailed thermal profile on an IC is very time consuming using finite element methods. The size of the system thermal analysis model may be much larger than a chip-only model and can be difficult to be solved efficiently if the mesh density on ICs at system level is not coarse. Further, there are many different switching scenarios for example, various system usages, that users may need to check on top ranked $T_{max}$ on-IC.

Thus, Applicants have recognized that there is a need for a system, software, and related methods to speed up the on-IC thermal solution in a IC/package or more complicated 3DIC designs including multiple ICs. Also, there is a need for fast thermal solution on IC-package-system to address various system usage scenarios.

SUMMARY OF THE DESCRIPTION

Machine assisted systems and methods for enhancing the resolution of an integrated circuit (IC) thermal profile from system analysis using a neural network-based thermal solver. A method according to one embodiment described herein relates to the preparation of training dataset and the training of a temperature rise predictor. The method can include the following operations: generating a representation of two or more templates identifying different portions of an integrated circuit (IC), each template comprising a plurality of tiles including a center tile, and each template associated with location parameters to position the template in the IC; performing thermal simulations for each respective template of the IC, each thermal simulation determining an output based on a power pattern of tiles of the respective template, the output indicating a change in temperature of a center tile of the respective template relative to a base temperature of the IC, the power pattern corresponding to a set of power levels powered on the tiles of the respective template for the thermal simulations, each tile of the respective template powered according to one of the set of power levels, each power level selected from a set of predefined power levels; and training a neural network with a plurality training data generated via the thermal simulations, each training data including location parameters of one of the templates for inputs to the neural network and including an output of one of the thermal simulations for the one template, the output of the one of the thermal simulations for an output from the neural network.

In one embodiment, the training of the neural network can provide a trained temperature rise predictor.

In one embodiment, the two or more templates can include a template along an edge of the IC and a template near a center of the IC.

In one embodiment, the two or more templates can include three templates on the IC.

In one embodiment, the tiles located outside of each template can be powered with an average power level during the thermal simulations.

In one embodiment, the thermal simulations can be performed for each template separately and wherein the thermal simulations include computational fluid dynamics simulations or finite element simulations.

In one embodiment, the performing thermal simulations for each respective template of the IC can be based on the location parameters and a relationship between a change in temperature relative to a power applied to the IC in the thermal simulations.

In one embodiment, the relationship between a change in temperature relative to power can be Theta-JA.

In one embodiment, the relationship between a change in temperature relative to power used in the thermal simulations can be varied across the thermal simulations.

In one embodiment, the set of predefined power levels can include three or more power levels.

In one embodiment, the tiles of each template located outside a border of the IC can be powered with a zero power level during the thermal simulations.

In one embodiment, each template can be divided into a center tile group and a ring tile group.

In one embodiment, the tiles in the center tile group can be powered with three or more power levels and the tiles in the ring tile group can be powered with two power levels to reduce a number of the power pattern during the thermal simulations.

Another embodiment relates to the use of the trained neural network model which can be used to determine a thermal behavior of a given tile on an IC. A method according to this another embodiment can include the following operations: retrieving from memory, a trained neural network model, the neural network model having been trained with a plurality of inputs and an output derived from thermal simulations, the plurality of inputs comprising a relationship between a change in temperature relative to power, a predetermined template location, and a pattern of a plurality of predefined power levels in tiles associated with the template; and determining, using the retrieved neural network model, a change in a temperature of a given tile on an integrated circuit (IC) having a location relative to the predetermined template location, a plurality of inputs to the neural network model including: (1) a selected relationship between a change in temperature relative to a power applied to the IC in the thermal simulations, (2) a selected predetermined location of the template, and (3) a selected pattern of the predefined power level for the template.

In one embodiment, the determining can be repeated for each tile on the IC using the retrieved neural network model.

In one embodiment, the thermal simulations include computational fluid dynamics (CFD) simulations and finite elements (FE) simulations.

In one embodiment, the method can further include the operation of appending a temperature rise map based on the change in the temperature of the given tile to the IC system thermal profile to generate a detailed thermal profile for the IC.

In one embodiment, the method can also include the following operations: generating a base temperature profile of the IC having a coarse mesh by a system thermal tool based on an initial temperature and a corresponding temperature-dependent power map of the IC; in response to the generating the base temperature profile of the IC, updating the corresponding temperature-dependent power map of the IC by the system thermal tool; determining, using the retrieved trained neural network model, a temperature rise of the given tile on the IC based on the updated corresponding temperature-dependent power map of the IC; appending the determined temperature rise of the given tile to the generated base temperature profile of the IC to update the generated base temperature profile of the IC; updating the generated power map of the IC based on the updated generated base temperature profile of the IC; and determining, using the trained neural network model, a subsequent temperature rise of the given tile on the IC based on the updated generated power map of the IC.

Further, in one embodiment, the method can include the following operations: iterating a convergence loop based on coarse mesh on the IC to obtain a converged power level for each tile on the IC and a converged thermal profile for each tile on the IC; and determining, using the retrieved neural network model, a temperature rise of the given tile on an integrated circuit (IC) having a location relative to the predetermined template location, the plurality of inputs to the neural network model including: (1) the selected relationship between a change in temperature relative to the power applied to the IC in the thermal simulations, (2) the selected predetermined location of the template, and (3) the selected pattern of the converged power level for the template.

In one embodiment, the neural network model can include a deep neural network (DNN) model.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 2B shows an example of a template near the corner of an IC and a template along the edge of an IC according to an embodiment.

FIG. 2C shows an example of a template near the center of an IC used to generate training data according to an embodiment.

FIG. 11A shows an example of a DNN training for a higher resolution thermal profile according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can use a neural network-based temperature rise predictor that has been trained, thereby enabling the trained temperature rise predictor to determine a temperature profile in a given integrated circuit (IC). Hence, this approach can be a much faster approach and provide more detailed temperature profile by using the trained temperature rise predictor. This approach can also provide a high resolution temperature profile in a given IC.

Figure 1A:
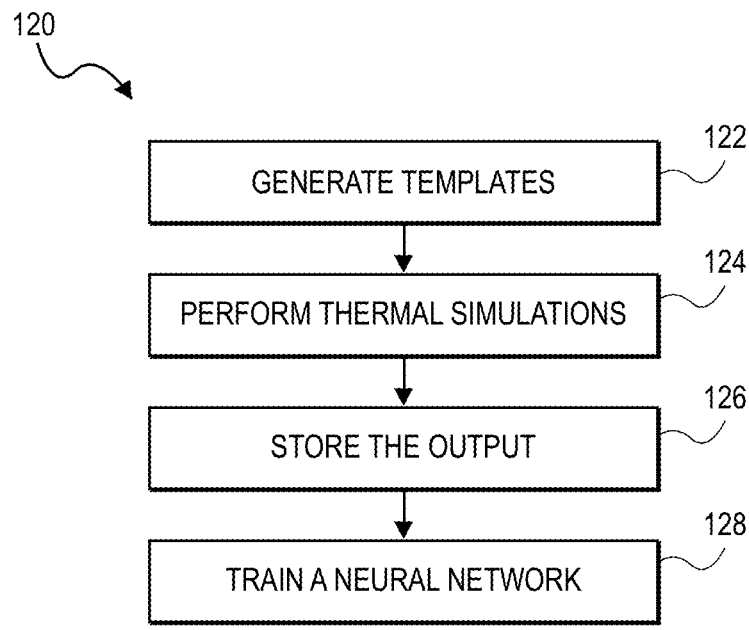
FIG. 1A is a flowchart which illustrates an overview method according to one embodiment which includes training data generation and training of the predictor.

FIG. 1A shows an example which includes training dataset generation and training a neural network to derive a trained temperature rise predictor. FIG. 1A represents an overview of a method 120 according to one embodiment. In operation 122, a data processing system, such as the data processing system shown in FIGS. 13A-13C, can generate a representation of two or more templates identifying different portions of an integrated circuit (IC), each template having a plurality of tiles including a center tile, and each template associated with location parameters to position the template in the IC.

In one embodiment, the method 120 can include an operation 124. In operation 124, thermal simulations can be performed for each respective template of the IC. The thermal simulations can include computational fluid dynamic (CFD) simulations or Finite elements (FE) simulations. Each thermal simulation can determine an output based on a power pattern of tiles of the respective template. The output can indicate a change in temperature of a center tile of the respective template relative to a base temperature of the integrated circuit. The power pattern can correspond to a set of power levels powered on the tiles of the respective template for the thermal simulations. Each tile of the respective template can be powered according to one of the set of power levels. Each power level can be selected from a set of predefined power levels. In some embodiments, for example, the set of predefined power levels can include three or more power levels.

In one embodiment, the preparation of the training dataset can include an operation 126 as shown in FIG. 1A. In operation 126, the determined output can be stored to generate a plurality of outputs associated with the set of the plurality of inputs.

In one embodiment, the method 120 can further include an operation 128. The operation 128 can include training a neural network with a plurality training data generated via the thermal simulations. Each training data can include the location parameters of one of the templates for inputs to the neural network and including an output of one of the thermal simulations for the one template, the output of the one of the thermal simulations for an output from the neural network.

Figure 1B:
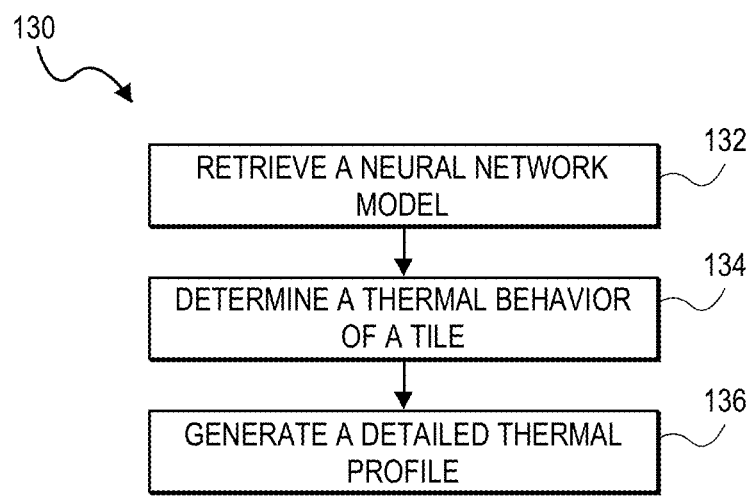
FIG. 1B shows a flowchart which illustrates the use of a trained predictor according to one embodiment.
Figure 1C:
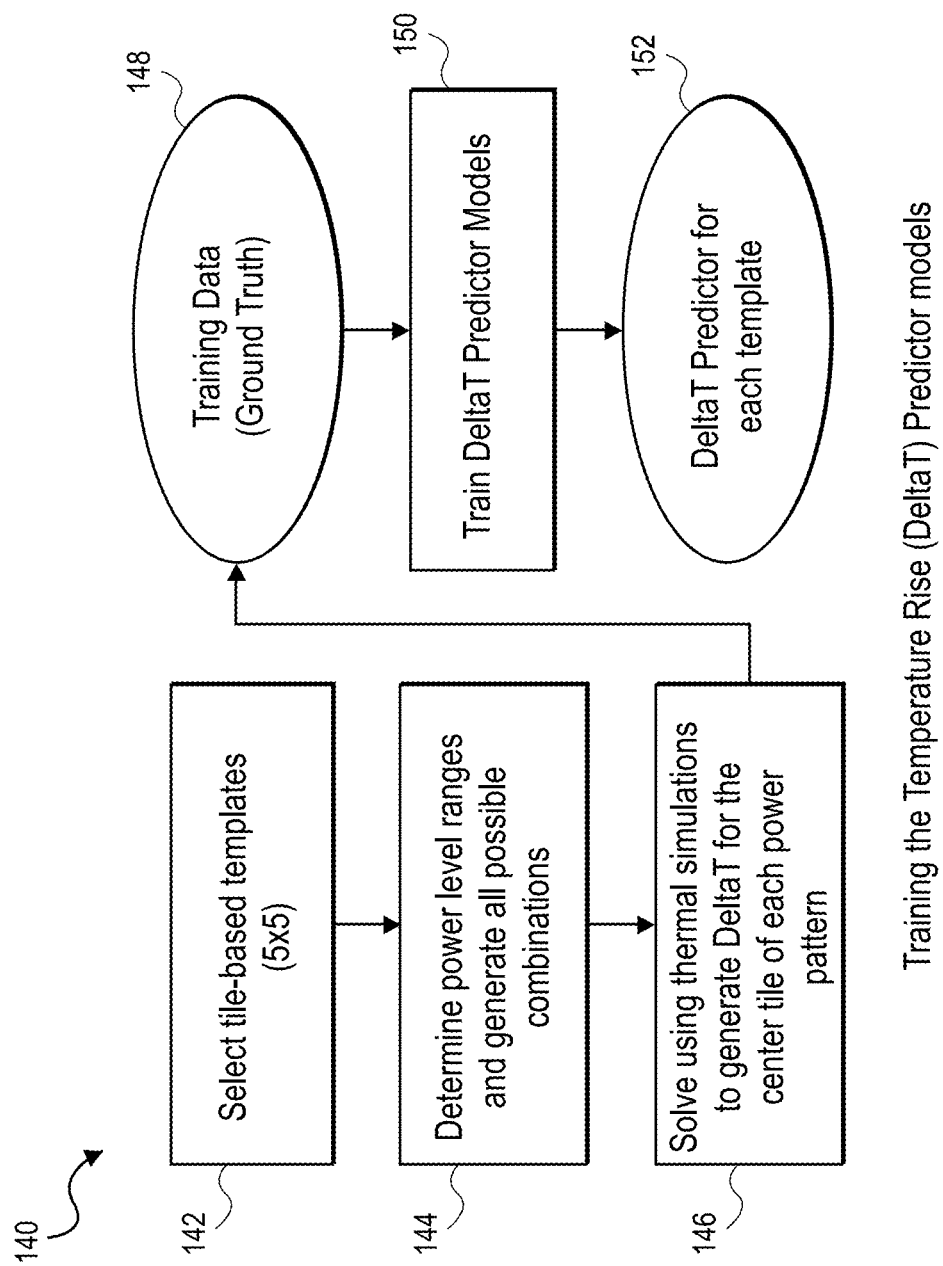
FIG. 1C shows a flowchart which illustrates the training of DeltaT predictor models according to one embodiment.

FIG. 1C shows a flowchart that illustrates an example which includes training temperature rise (DeltaT) predictor models. FIG. 1C represents an overview of a method 140 according to one embodiment. In operation 142, a data processing system can select tile-based templates. For example, a 5 by 5 template having 25 tiles can be selected. In operation 144, the data processing can determine a range of power levels. A number of power patterns can be generated based on all possible combinations of the determined range of power levels. In operation 146, the data processing can generate DeltaT of the center tile of each generated power pattern via thermal simulations. The thermal simulations can include Finite Element Analysis (FEA) or computational fluid dynamics (CFD) simulations.

Still referring to FIG. 1C, the generated DeltaT from the thermal simulations and the corresponding generated power pattern can be stored as training data 148 in a database in communication with the data processing system. In Operation 150, the data processing system can train a neural network to derive a DeltaT predictor. The training can provide a trained DeltaT predictor 152 for each selected template.

With reference to FIG. 1B, the trained predictor can be used to predict a temperature rise of a tile on an IC. Fast on-IC thermal analysis can be possible with the trained predictor that provides a DNN-based fast thermal solver given the Theta-JA and a rough IC thermal profile from a system-level thermal analysis with coarse on-IC mesh. In one embodiment of method 130, in an operation 132 a trained neural network model can be retrieved from a memory. The neural network model may have been trained with a plurality of inputs and an output derived from thermal simulations. The thermal simulations can include computational fluid dynamics (CFD) simulations or Finite Elements (FE) simulations. According to one embodiment of the present disclosure, the plurality of inputs can include a relationship between a change in temperature relative to power, a predetermined template location, and a pattern of a plurality of predefined power levels in tiles associated with the template. In operation 134, the retrieved neural network model can be used to determine a change in a temperature of a given tile on an integrated circuit (IC) having a location relative to the predetermined template location, a plurality of inputs to the neural network model including: (1) a selected relationship between a change in temperature relative to a power applied to the IC in the thermal simulations, (2) a selected predetermined location of the template, and (3) a selected pattern of the predefined power level for the template.

In one embodiment, the determination of the change in the temperature for each tile can be repeated for each tile on the IC using the retrieved trained neural network model. In one embodiment, the thermal simulations can include computational fluid dynamics (CFD) simulations and finite elements (FE) simulations.

In one embodiment, the retrieved neural network model can determine a thermal behavior of the given tile on the IC. The thermal behavior of the given tile on the IC can include a temperature rise map.

In one embodiment, in operation 136, the temperature rise map based on the change in the temperature of the given tile can be appended to the IC system thermal profile to generate a detailed thermal profile for the IC.

In operation 132, a base temperature profile of a target IC model can be received from a system thermal simulator. The base temperature profile of the target IC model can be determined based on a uniform power or a rough power map being applied to the target IC model. Then, a Theta-JA value and a detailed power map of the target IC model can be received. The detailed power map of the target IC model can include a plurality of target power patterns having the same dimension as a constructed template.

Figure 1D:
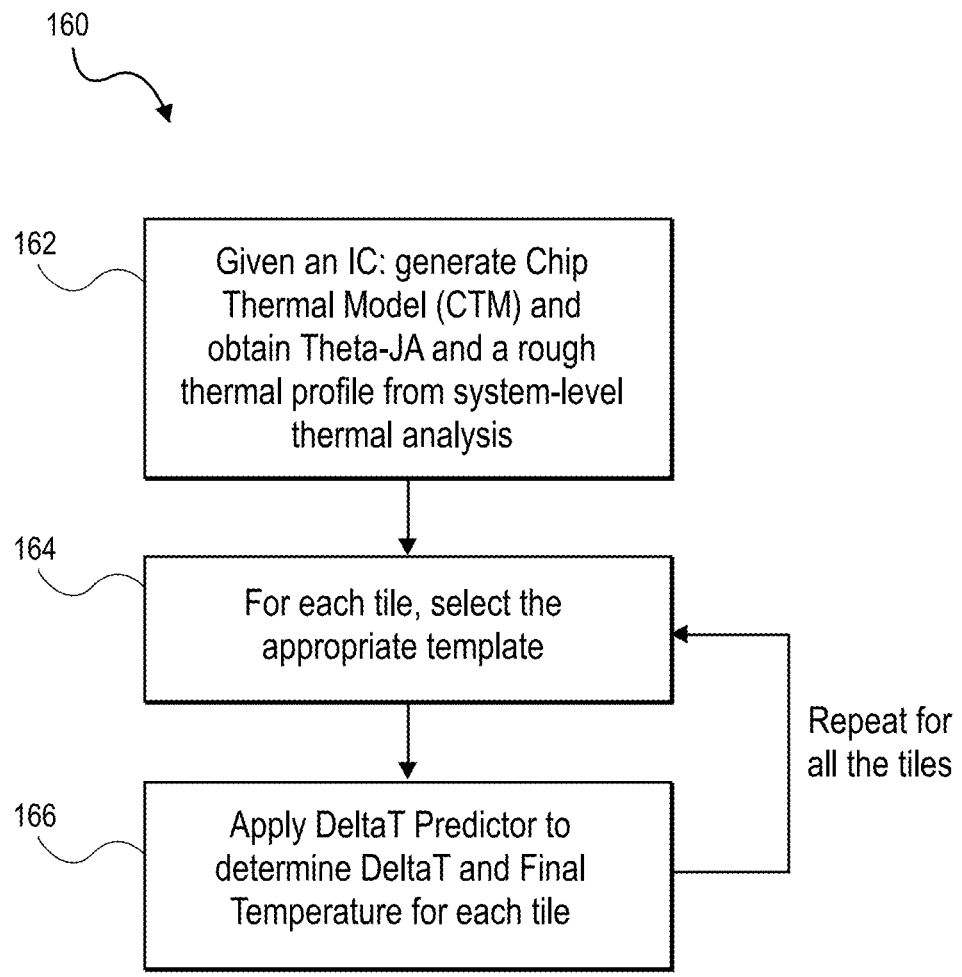
FIG. 1D shows a flowchart which illustrates the inferencing of DeltaT using the DeltaT predictor models according to one embodiment.

An example of method 160 to illustrate the use of a trained DeltaT predictor 152 is shown in FIG. 1D. In operation 162, the data processing system can generate a Chip Thermal Model (CTM) to obtain Theta-JA and a rough thermal profile from system-level thermal analysis for a given IC. In operation 164, for a given tile on the IC, the data processing system can select the appropriate template. In operation 166, the data processing can apply the trained DeltaT predictor 152 based on the selected template to determine DeltaT and the final temperature for the given tile on the IC. Operations 164 and 166 can be repeated for all the tiles on the IC to determine DeltaT and the final temperature for all the tiles on the IC.

Figure 2A:
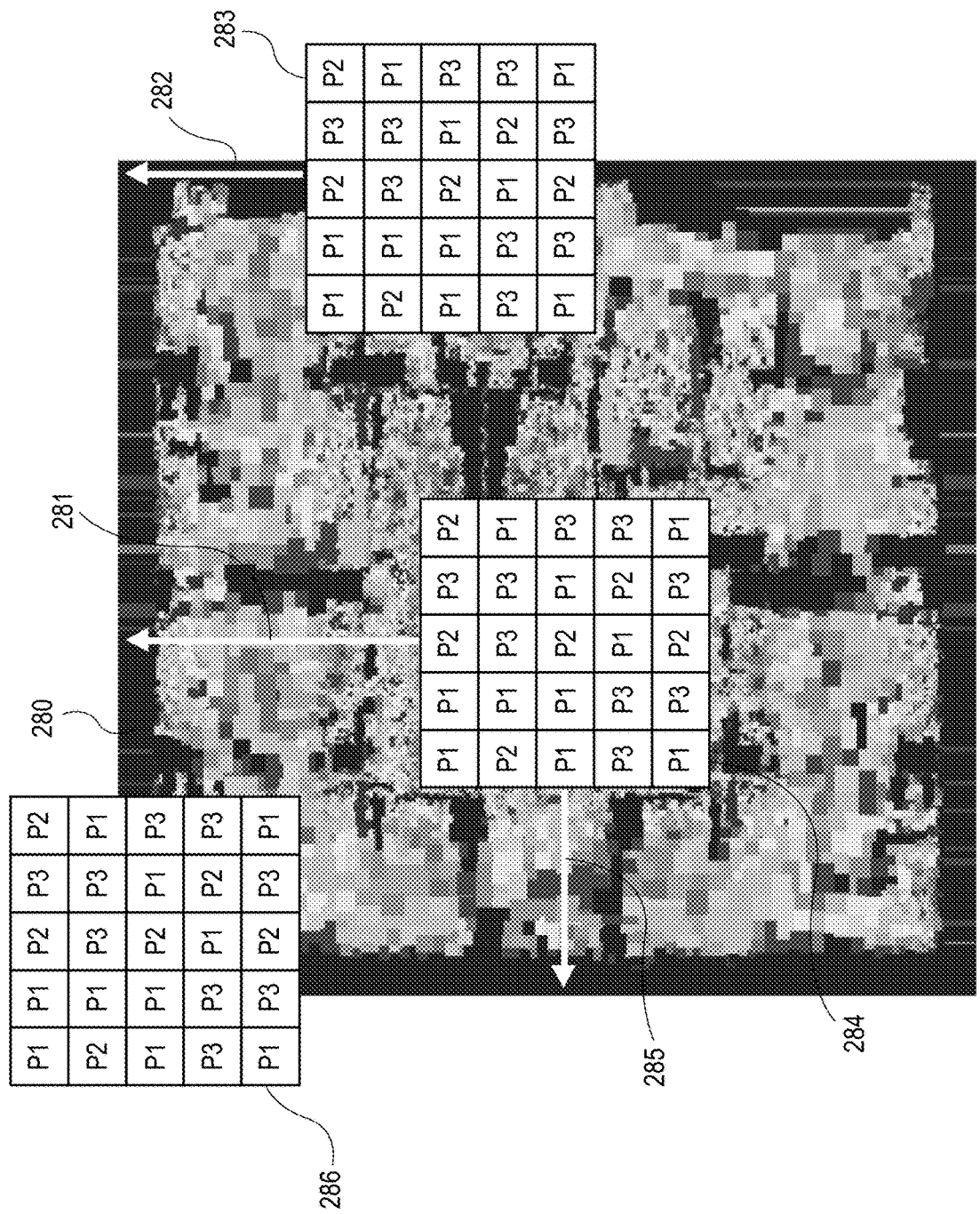
FIG. 2A shows an example of three templates used to generate training data according to an embodiment.

FIG. 2A shows an example of a representation of three templates that can be used to generate training data. The three templates can identify different portions of an integrated circuit (IC). Each template can include a plurality of tiles including a center tile. Each template can be associated with location parameters to position the template in the IC.

In one embodiment, for example, the data processing system can generate three templates 283, 284, and 286 at a plurality of predetermined locations on the IC 280 as illustrated in FIG. 2A. Each template 283, 284, or 286 can have N by N tiles as illustrated in FIG. 2A. In this example, N can be 5.

In one embodiment, the two or more templates can include a template along an edge of the IC and a template near a center of the IC. In another embodiment, the two or more templates can include three templates on the IC. The two or more templates can also include a template at a corner of the IC. Still referring to FIG. 2A, the template along and edge of the IC can be denoted by 283, the template near a center of the IC can be denoted by 284, and the template at a corner of the IC can be denoted by 286.

In one embodiment, the predetermined location of a template can be determined based on location parameters including a distance of a center tile on the template to a nearest boundary Dx, Dy of the IC and also the tile size, Ts on the template. For example, a function f(Dx, Dy, Ts) can be used to determine the predetermined location of the template.

In one embodiment, the function f(Dx, Dy, Ts) can determine the template is near the center of the IC if Dx is less than 2.5 of the tile size, Ts and Dy is less than 2.5 of the tile size, Ts.

In another embodiment, the function f(Dx, Dy, Ts) can determine the template is at a corner of the IC if Dx equals or more than 2.5 of the tile size, Ts and Dy equals to or more than 2.5 times of the tile size, Ts.

In one embodiment, the function f(Dx, Dy, Ts) can determine the template is along an edge of the IC if the template is not within the IC or not at the corner of the IC.

In one embodiment, N can include 5 and therefore, the total number of tiles on a template can be 25. In one embodiment, each tile on the template can have a size of K(μm) by K(μm). According to the present disclosure, K can include 10.

In one embodiment, for example, the template 284 located near a center of the IC can include Dx1 285 and Dy1 281 as a coordinate on the IC as illustrated in FIG. 2A. Dx1 285 and Dy1 281 can be measured from the center tile of the template 284 near the center of the IC. The template located at any of the four corners of the IC can be considered as a corner template 286. As further illustrated in FIG. 2A, the template 283 located at a border of the IC 280 can include Dy2 282 as a coordinate on the IC 280. Dy2 282 can be measured from the center tile of the border template 283.

Figure 8:
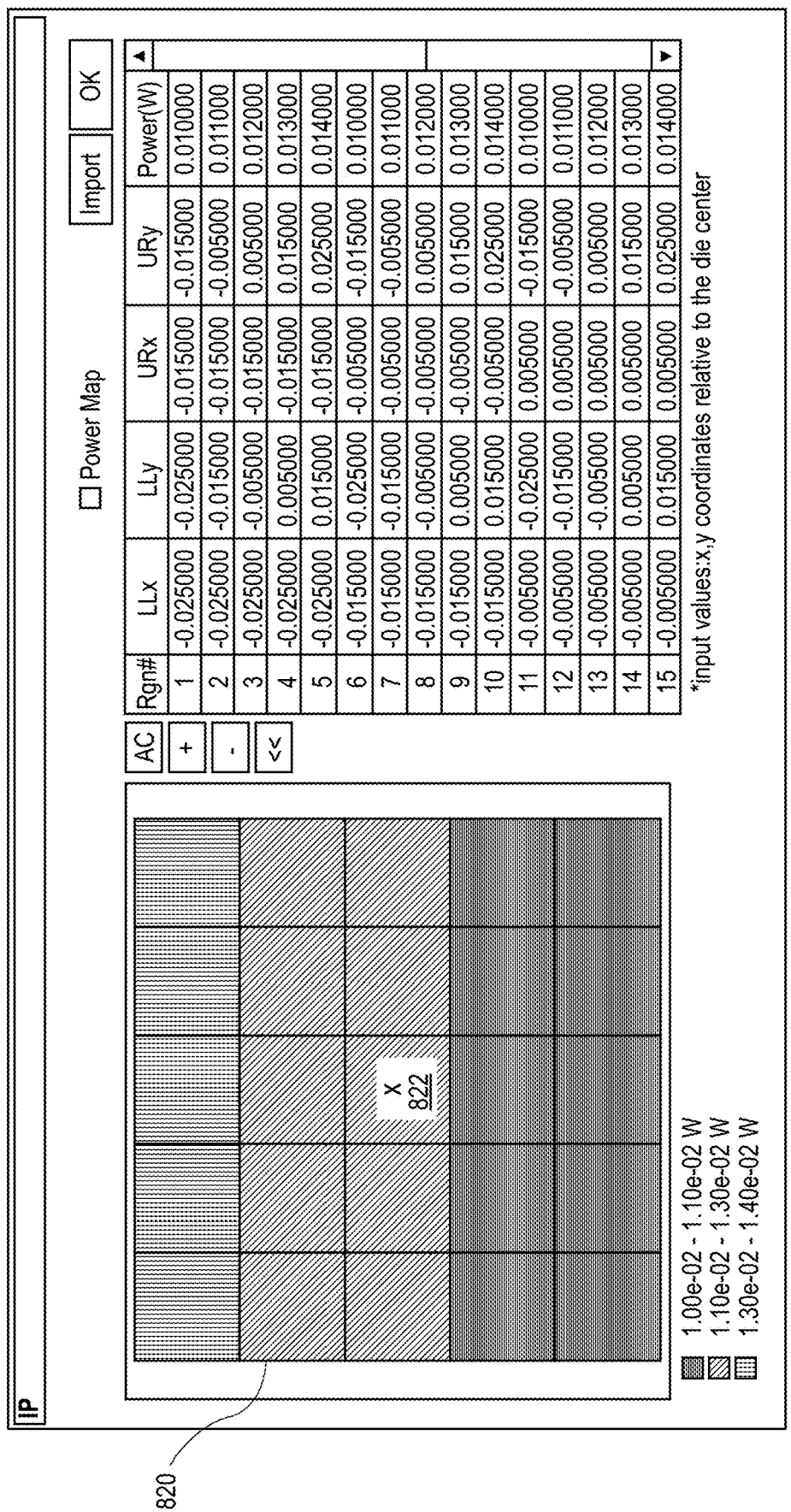
FIG. 8 illustrates an example template of 5×5 tiles for localized heating according to one embodiment.

FIG. 8 shows an example of any of the templates having 5 by 5 tiles to account for a localized heating on an IC. It can be shown that a thermal impact from neighboring tiles can decay rapidly beyond 30 μm with respect to the center tile of the template. In this embodiment, an enhancement to a silicon block model for local heating effects can include extending each power on each tile on an IC to an array of tiles powered according to a set of predefined power levels, for example, 5 by 5 tiles having a local power pattern 820 as shown in FIG. 8. FIG. 8 shows two additional rows and two additional columns being added to the right and to the left of the center tile 822 of the template as the local heating zone. The inclusion of the local heating zone can ensure a proper thermal interaction among the tiles in extracting a temperature rise of the center tile on an IC. Temperature rise or DeltaT can be defined as the output of a change in temperature of a center tile temperature of the template relative to a base temperature of the IC.

Returning to FIG. 2A, each tile on a template, for example, can have three levels of power P1, P2, and P3 to account for a temperature dependency. A combination of three levels of power P1, P2, and P3 can create a pattern of the predefined power level for each of the two or more templates. In one embodiment, the power level on the 5 by 5 tiles template as shown in FIG. 2A can be configured based on a practical device power levels at low, medium, and high consistent to the technology node of the IC. As further illustrated in FIG. 2A, for a template having 5 by 5 tiles, the possible number of power pattern combinations generated from three levels of power P1, P2, and P3 can be $3^{25}$ that can equal to 847,288,609,443.

Figure 2B:
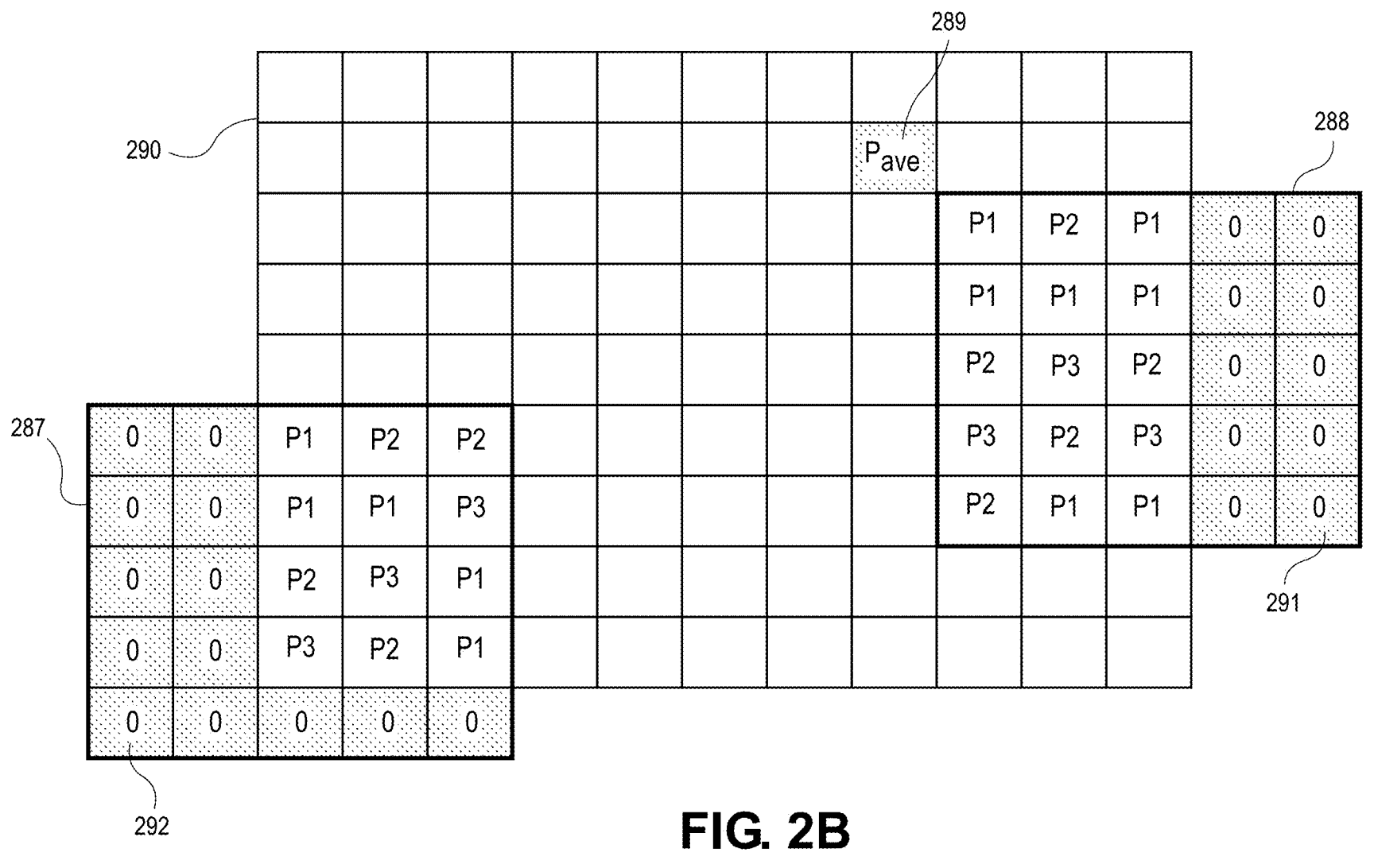

FIG. 2B shows an example of a corner template 287 and a border template 288. As shown in FIG. 2B, some of the tiles 292 (gray shaded) on the corner template 287 can be located outside of the edge of the IC 290 during a preparation of the training dataset. Similarly, some of the tiles 291 (gray shaded) on the border template 288 can be located outside of the edge of the IC 290 during thermal simulations. These tiles 291, 292 can be assigned a zero power level during thermal simulations. In one embodiment, the thermal simulations can include computational fluid dynamics (CFD) or Finite Element (FE) simulations. The tiles on each template located outside a border of the IC can be powered with a zero power level during the thermal simulations. In one embodiment, the tiles located in an area on the IC that may not be covered by each template or outside of each template can be powered with an average power during the thermal simulations. For example, a given tile on the IC 290 can be assigned an average power, Pave 289 (gray shaded) as shown in FIG. 2B. Accordingly, the rest of the tiles on the IC 290 that may not be covered by the corner template 287 and the border template 288 can be assigned an average power, Pave 289.

Figure 2C:
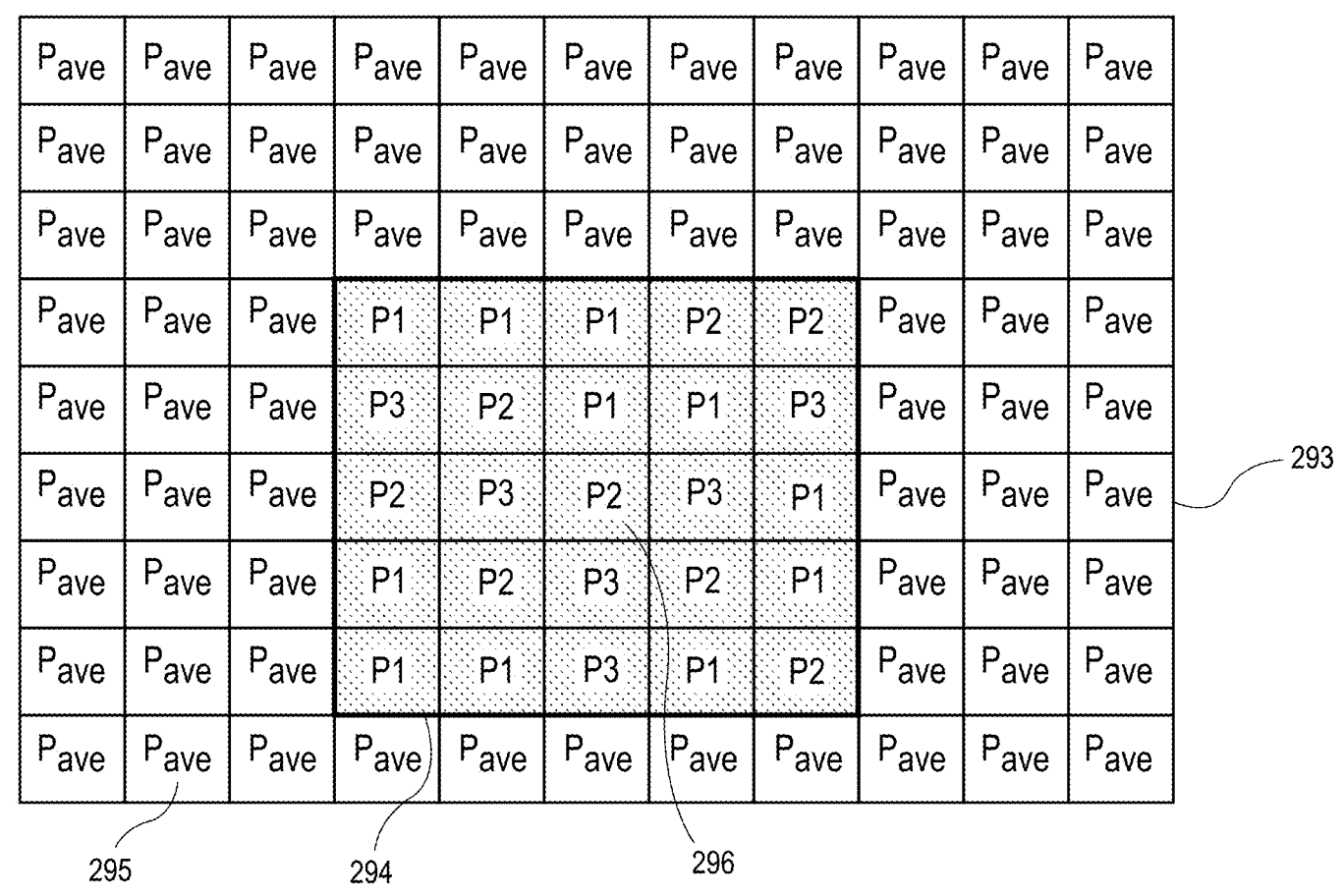

FIG. 2C shows an example of a template 294 (gray shaded) located near a center of an IC 293. In this embodiment, the tile that may not be covered by the template 294 on the IC 293 can be assigned with an average power during the thermal simulations. In one embodiment, the thermal simulations can include computational fluid dynamics (CFD) or Finite Element (FE) simulations. FIG. 2C shows the average power, Pave 295 can be assigned to each tile that may not be covered by the template 294 during the thermal simulations to generate training data. In one embodiment, the average power, Pave 295 can be lower compared to the total power in a template. In one embodiment, the average power, Pave 295 can be zero in the training data.

In one embodiment, the thermal simulations can be performed for each template separately. In one embodiment, the thermal simulations can include computational fluid dynamics (CFD) simulations or finite element (FE) simulations.

In some embodiments, the performing thermal simulations for each respective template of the IC can be based on the location parameters and a relationship between a change in temperature relative to a power applied to the IC in the thermal simulations. In one embodiment, the relationship between a change in temperature relative to power used in the thermal simulations can be varied across the thermal simulations.

Figure 3:
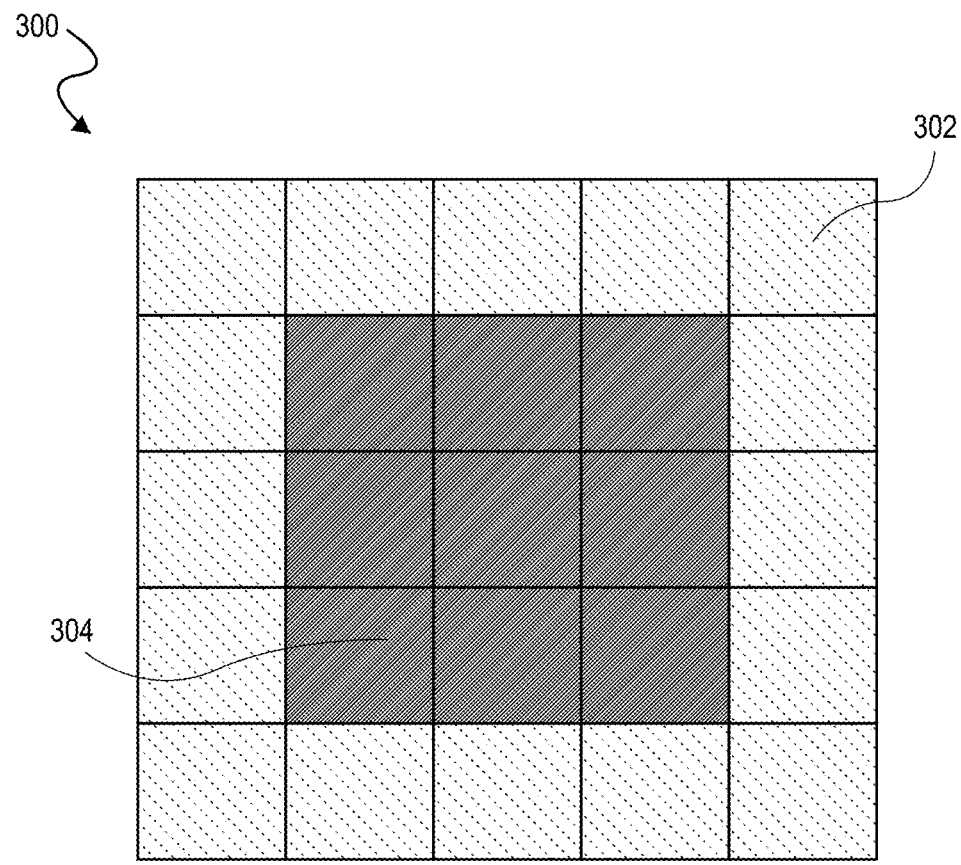
FIG. 3 shows an example of power-on-tile patterns Design of Experiment (DOE) used to reduce input training cases for a template according to an embodiment.

According to one embodiment, proper schemes can be developed to reduce the total number of power pattern combinations to be solved. In one embodiment, symmetry and DOE (Design of Experiment) technique can be used to reduce the total number of power patterns. A parallel processing can accelerate the reduction of the possible number of power pattern combinations. As illustrated in FIG. 3, for example, a 5 by 5 template 300 with 10 μm by 10 μm tile size can be divided into a center tile group 304 and a ring tile group 302. The center tile group 304 can include nine tiles and the ring tile group can include sixteen tiles. The tiles in the ring tile group 302 can be powered with two power levels to reduce a number of the power pattern during the thermal simulations. In one embodiment, the thermal simulations can include computational fluid dynamics (CFD) or Finite Element (FE) simulations. The tiles in the center tile group 304 can be powered with three or more levels of power density to reduce a number of the power pattern during the thermal simulations. In one embodiment, the thermal simulations can include computational fluid dynamics (CFD) or Finite Element (FE) simulations. In another embodiment, the input power density patterns of all the twenty-five tiles case can be further reduced using symmetry in X/Y directions. The reduction of power-on-tile patterns can be applied to any of the templates 283, 284, 286 as shown in FIG. 2A.

In another embodiment, thermal simulations can be performed based on a set of a plurality of inputs for each of the two or more templates. The plurality of inputs can include a predetermined location of the template, the pattern of the predefined power level for the template, and a relationship between a change in temperature relative to a power applied to the IC in the thermal simulations to determine an output of a change in temperature of one or more tile temperatures of each of the two or more templates relative to a base temperature of the integrated circuit. A conduction-based Finite Element Method thermal solution can also be used to determine an output of a change in temperature of a center tile temperature of each of the two or more templates relative to a base temperature of the integrated circuit. The determined output of a change in temperature of a center tile temperature of each of the two or more templates relative to a base temperature of the integrated circuit can be used as a ground truth. According to an embodiment, the relationship between a change in temperature relative to a power can be known as a Theta-JA. Thermal characteristic, for example, Theta-JA, of a IC in package of a system can reflect the environment impact to the IC. Theta-JA can be represented by Equation (1)

$$\theta_{JA} = \left(\frac{T_J - T_A}{P}\right) \quad (1)$$

where $\theta_{JA}$ being a Theta-JA in ° C./W, $T_J$ being an Operating Junction temperature in ° C., typically $T_{max}$ on an IC, $T_A$ being an Ambient Operating Temperature ° C., and P is Power Dissipation in W.

In one embodiment, Theta-JA, can be extracted from the thermal simulations. In one embodiment, the thermal simulations can include computational fluid dynamics (CFD) or Finite Element (FE) simulations.

In one embodiment, a typical Ball Grid Array (BGA) package on thermal board configurations at a selected Theta-JAs from low to high values, for example, 10 to 120 C/W, can be used to cover the possible range of Theta-JA when predicting the temperature rise in a realistic system analysis. This selected Theta-JAs that are determined during a preparation of the training dataset can be used in an interpolation to match the system Theta-JA of a given IC when predicting the temperature rise. When predicting the temperature rise of a given tile on an IC, for a selected Theta-JA in a given IC, the selected Theta-JA can be matched to a Theta-JA from the possible range of Theta-JA through an interpolation.

Figure 4:
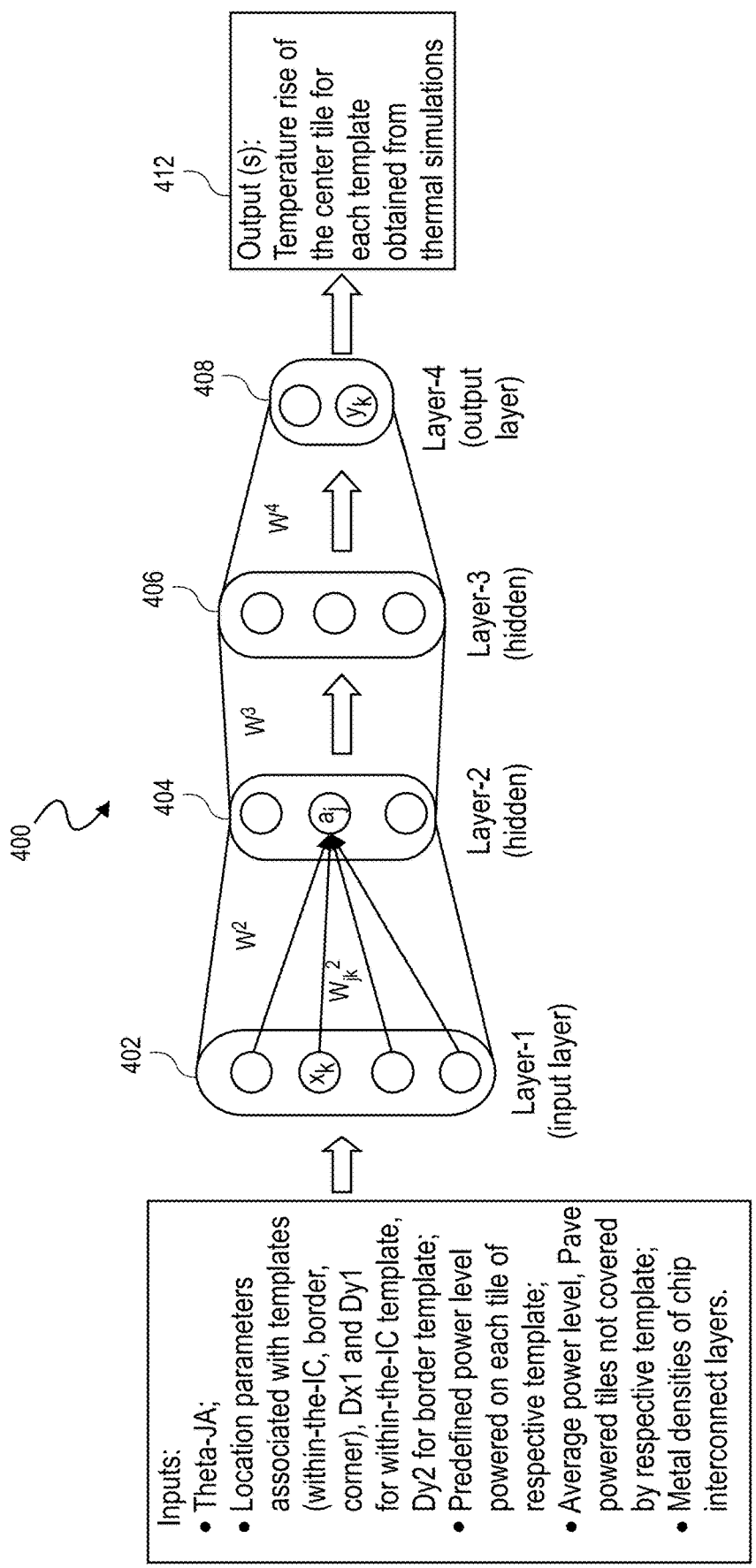
FIG. 4 shows an example of a deep neural network which can be used in one embodiment for a trained predictor.

In one embodiment, the neural network such as 400 in FIG. 4 can be trained, one at a time for a given determined output 408, by applying the plurality of inputs 402 for the given determined output 408 from the generated plurality of outputs to the neural network 400.

In one embodiment, the training can provide a trained temperature rise predictor. The neural network 400 in FIG. 4 can include a Deep Neural Network (DNN).

In one embodiment, for a given Theta-JA value, a large number of power patterns and the determined output of a change in temperature of a center tile temperature of a template relative to a base temperature of the integrated circuit can be used as the training dataset in training the neural network to derive a trained temperature rise predictor.

In one embodiment, a plurality training data generated via the thermal simulations can be used to train the neural network 400. The plurality of training data can include a plurality of generated outputs generated via the thermal simulations based on a given plurality of inputs. The thermal simulations can include computational fluid dynamics (CFD) simulations or Finite Element (FE) simulations. As shown in FIG. 4, the neural network 400 can be trained with the generated plurality of outputs 412 and the associated set of the plurality of inputs 410 from each of the thermal simulations. In one embodiment, the plurality of inputs 402 to the neural network 400 can include a plurality of inputs 410 used for thermal simulations. The plurality of inputs 402 can include Theta-JA value, location parameters associated with each template (Dx1 and Dy1 for within-the-chip template, Dy2 for border template), predefined power level powered on each tile of the respective template, and average power level, Pave powered tiles that are not covered by the respective template. The plurality of inputs 402 can also include metal densities of the IC interconnect layers. In one embodiment, for example, the template can include a template located near the center of the IC, a template located along the edge of the IC, and a template located near the corner of the IC. In one embodiment, the output 408 given to the neural network can include the generated plurality of outputs 412 from the thermal simulations. The generated plurality of outputs 412 can include a temperature rise of the center tile for each template obtained as a result of the thermal simulations based on the plurality of inputs 410. In one embodiment, generated plurality of outputs 412 can indicate a change in temperature of a center tile of the respective template relative to a base temperature of the integrated circuit.

FIG. 4 illustrates an example of a DNN 400 which can include four hidden layers 402, 404, 406, and 408 with hundreds of neurons per layer for regression purposes. These four hidden layers can be trained using techniques known in the art in which inputs received from data processing are applied as inputs to the input layer which is layer 402 while also applying outputs which are expected outputs (for a given input) to the output layer which is output layer 408.

Further information about deep neural networks can be found in the article "Deep Learning" by Yann LeCun, Yoshua Bengio, and Geoffrey Hinton in Nature Vol 521, 7553, page 436 (2015).

Figure 5:
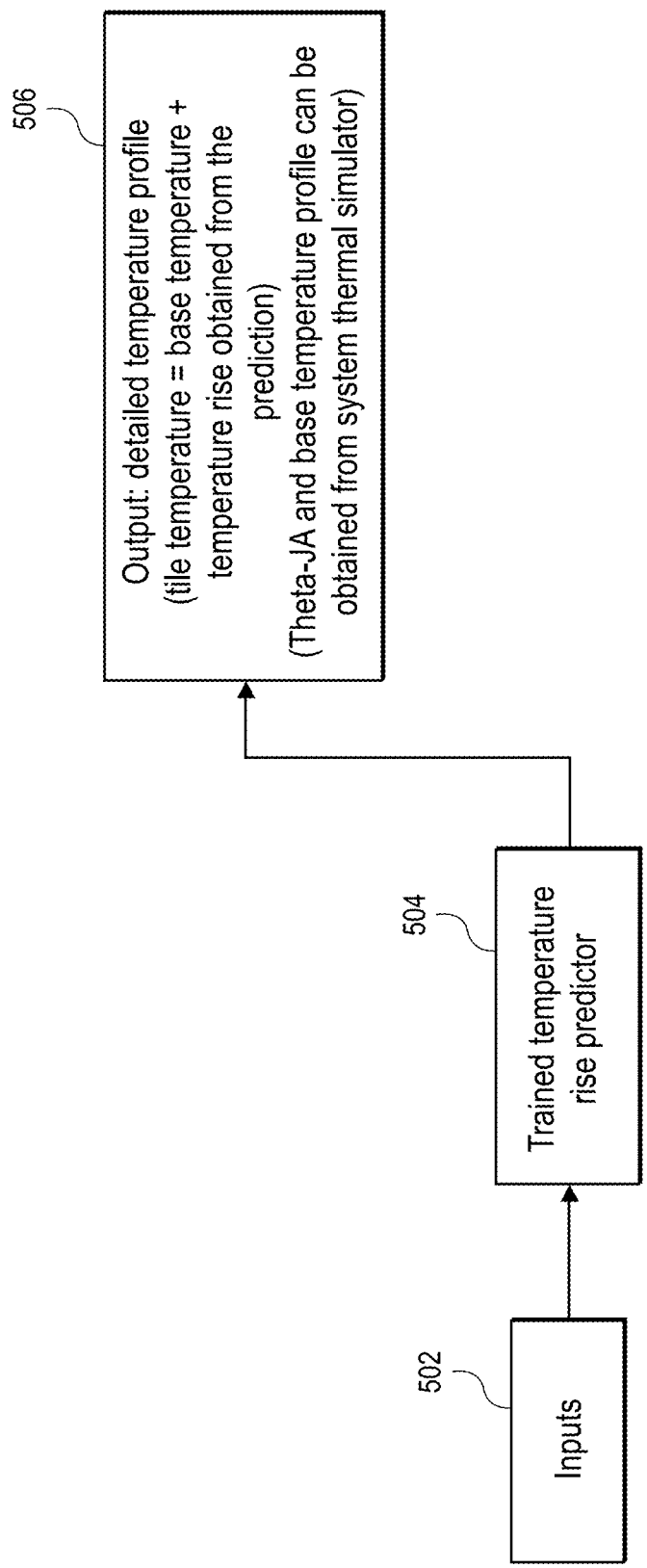
FIG. 5 shows an example of how the trained temperature rise predictor can be used to generate a fine temperature profile according to one embodiment.

An example of the use of a trained temperature rise predictor is shown in FIG. 5. The trained temperature rise predictor can be implemented on a data processing system which includes the trained predictor 504 and can include other components described below. In one embodiment, the trained temperature rise predictor 504 can be implemented in software that accesses a data structure containing trained constants or other values that were generated from the training of the predictor, and the software can execute on a data processing system.

Figure 13A:
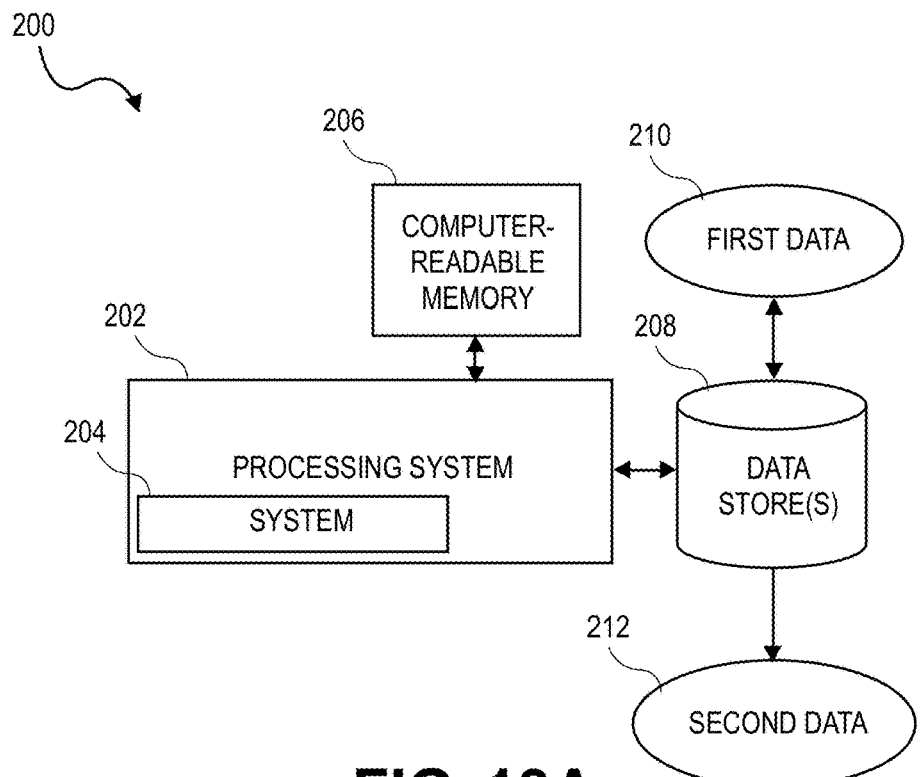
Figure 13B:
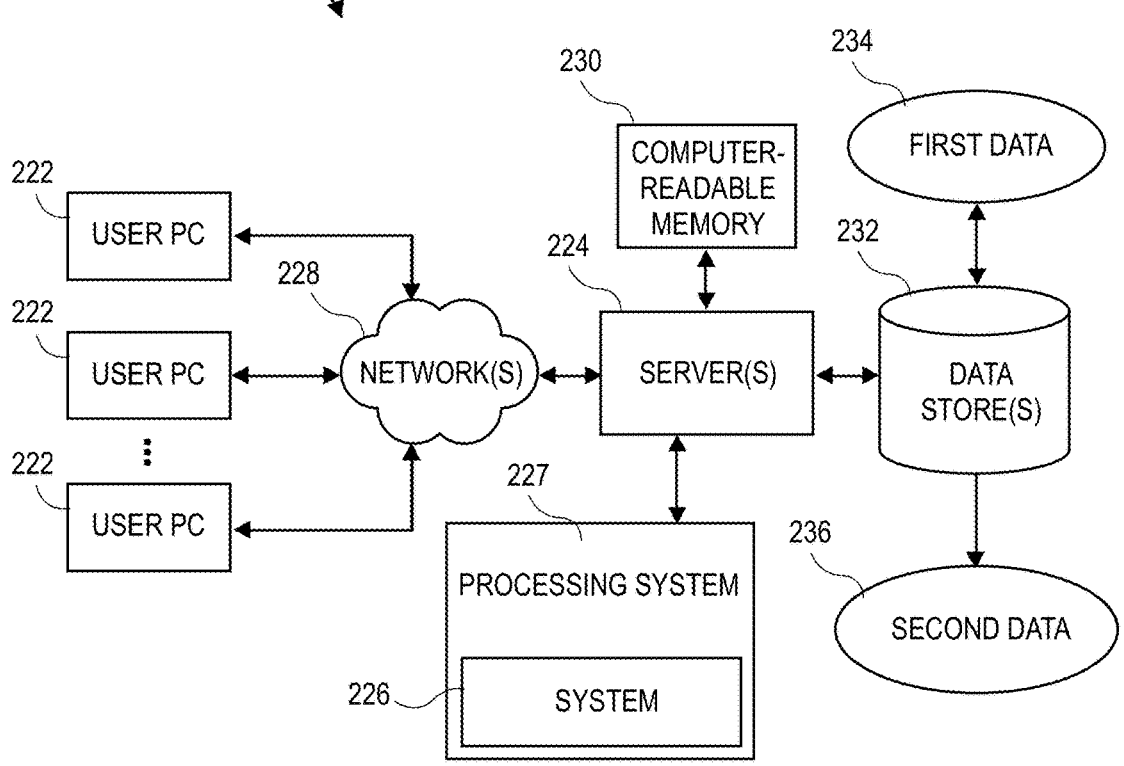
Figure 13C:
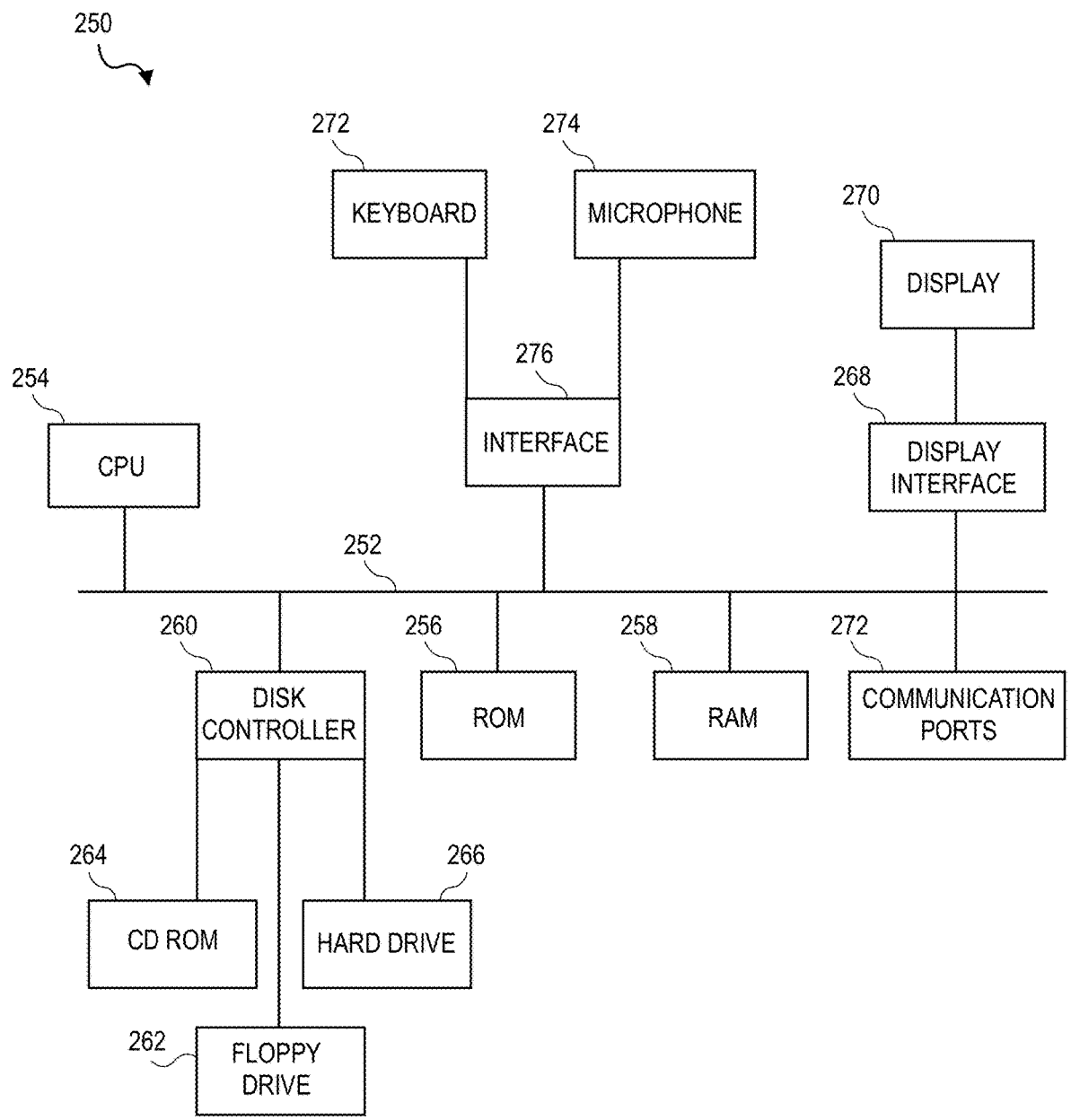
Figure 14:
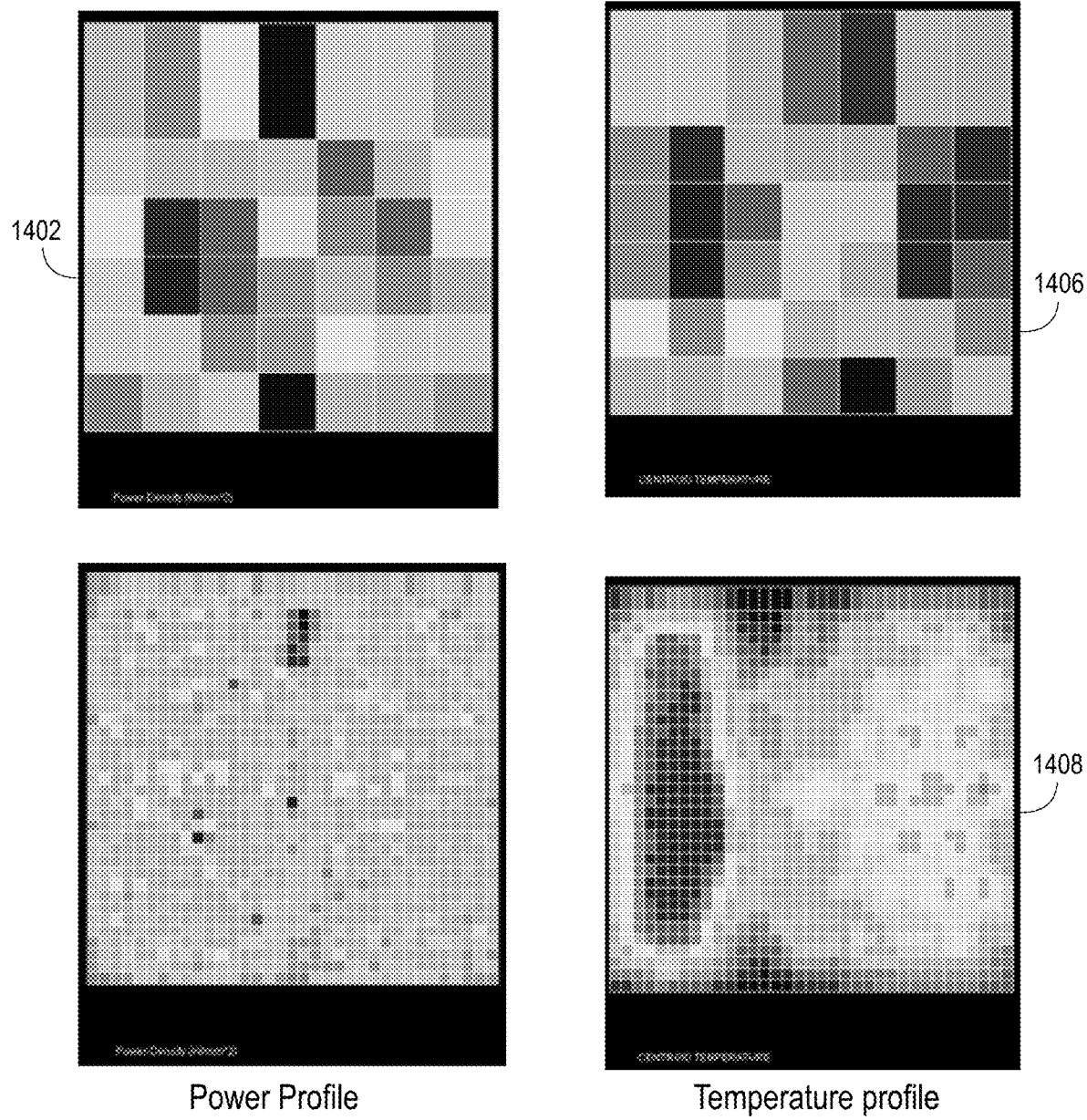
FIG. 14 shows an example of coarse mesh (100 μm tiles) and fine mesh (10 μm tiles) in an IC thermal analysis according to one embodiment.

As further illustrated in FIG. 5, a data processing system, such as the data processing system shown in FIGS. 13A-13C, can receive a plurality of inputs 502 that can include an initial thermal profile, a Theta-JA, and a power map of a real IC from a system level thermal simulation. The system level thermal simulation can use a CFD or an FE analysis that can be based on a coarse mesh and smeared power 1402 on the IC as shown in FIG. 14. With the system level thermal simulation, an actual temperature rise due to a localized heating of IC devices may not be able to be predicted well. For example, a temperature profile 1406 can be generated from the coarse mesh system level thermal simulation. High granularity in IC modeling, for example, at 10 μm level can be difficult to be included in the system level analysis. A more detailed IC sub-modeling can work with the system model to increase the resolution but it can be very costly. The trained temperature rise predictor 504 can provide accurate yet very fast prediction of a fine mesh temperature profile 1408.

In one embodiment, for an IC test package with a Theta-JA in JEDEC test conditions, $T_{max}$ near the center of the IC can be given as $T_{ref}$+Theta-JA×Total_Power. The thermal profile on the IC usually can indicate a slightly decreasing temperature from the center of the IC to the edge or corner of the IC. The thermal profile on the IC can be uniform near the center of the IC. A local temperature rise can be observed if there is a localized heating from a IC device near the center of the IC while the thermal profile for the rest of the area remains the same. This local temperature rise can be assumed to be applicable to devices near the center of a given IC of any size in a system. A temperature rise map on an IC can be generated directly by determining each temperature rise contributed by each localized heating on an IC.

In some embodiments, for example, the localized heating can be defined by the various power distributions on a template. For example, FIG. 2C shows an example a 5 by 5 template 294 with 10 μm tile resolution having various power level distributed across the template. The various power distributions on the 5 by 5 template with 10 μm resolution can be sufficient to represent most of the logic cells in modern ICs considering thermal interactions of neighboring devices. The temperature response at the tile 296 located at the center of the 5 by 5 template 294 can be used to represent the temperature rise or DeltaT based on a local power pattern.

Figure 7:
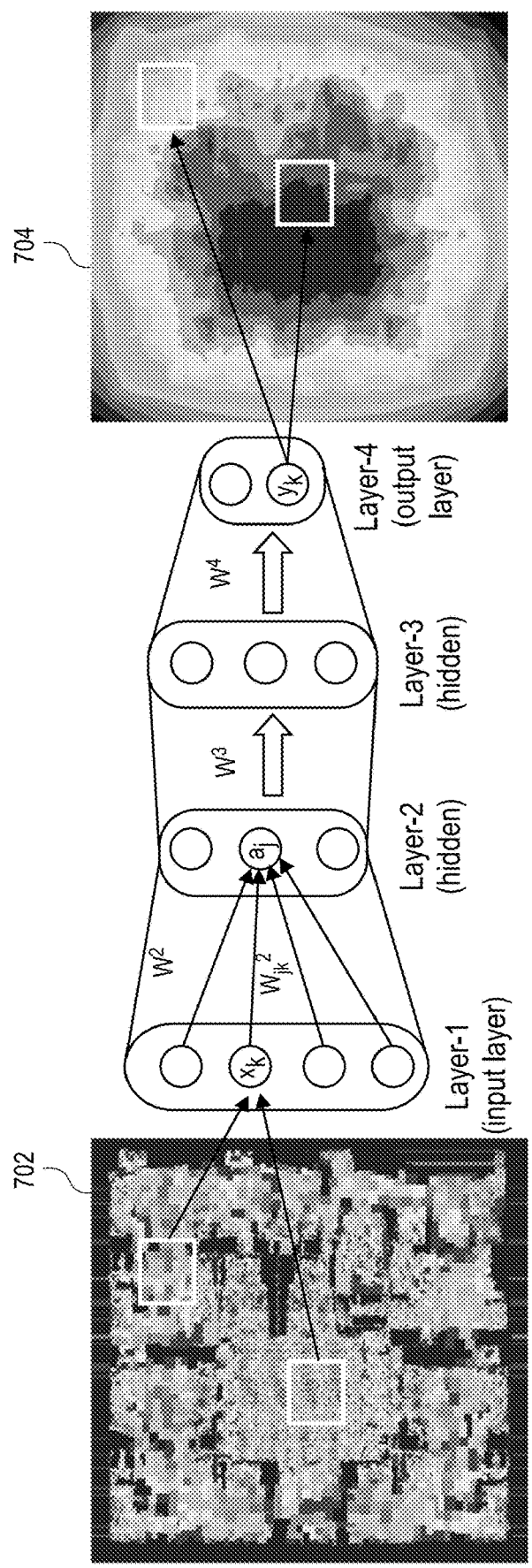
FIG. 7 illustrates a method for using a trained predictor according to one embodiment.

As illustrated in FIG. 5, the output in 506 can include a fine temperature profile of a tile on the IC. The tile temperature can include a base temperature provided from a system thermal simulator and a temperature rise determined by the trained temperature rise predictor. The trained temperature rise predictor can predict a temperature rise of each tile on the IC based on the received Theta-JA and the power map 702 to generate a fine temperature rise map 704 as illustrated in FIG. 7. During a prediction, the trained temperature rise predictor can extract the temperature rise at the center tile of the 5 by 5 template that has the consistent power pattern at a location in the full IC power map based on the Theta-JA of the IC in the system and the tile-based power map received from the IC power tool. The template can be used to predict the temperature rise for all the tiles on the IC until all the tiles in the power map for the system IC can be covered. As a result, a temperature rise map 704 of the IC can be generated as shown in FIG. 7. In one embodiment, before applying the trained temperature rise predictor on a given tile on the IC, a window of tiles having the size of a template can be generated to surround the given tile.

In one embodiment, the trained temperature rise predictor can be a machine learning predictor such as a neural network predictor or other machine learning predictors that are known in the art. The trained temperature rise predictor can be trained to determine a temperature rise of each tile on the IC.

In some embodiments, the IC model can be partitioned into a plurality of tiles. For each tile on the IC model, a target tile can be identified. The target tile can identify a corresponding target power pattern on the detailed power map. A trained temperature rise predictor can be selected based on the location of the target tile to the constructed template having a template power pattern.

Figure 9:
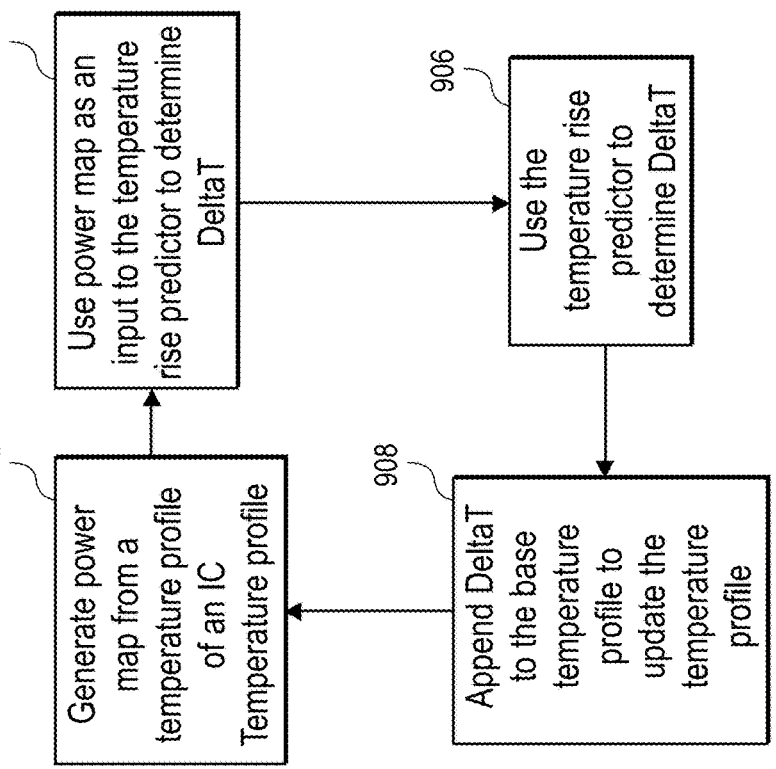
FIG. 9 illustrates an example of how the trained predictor can be used for a power-thermal convergence according to one embodiment.
Figure 9:
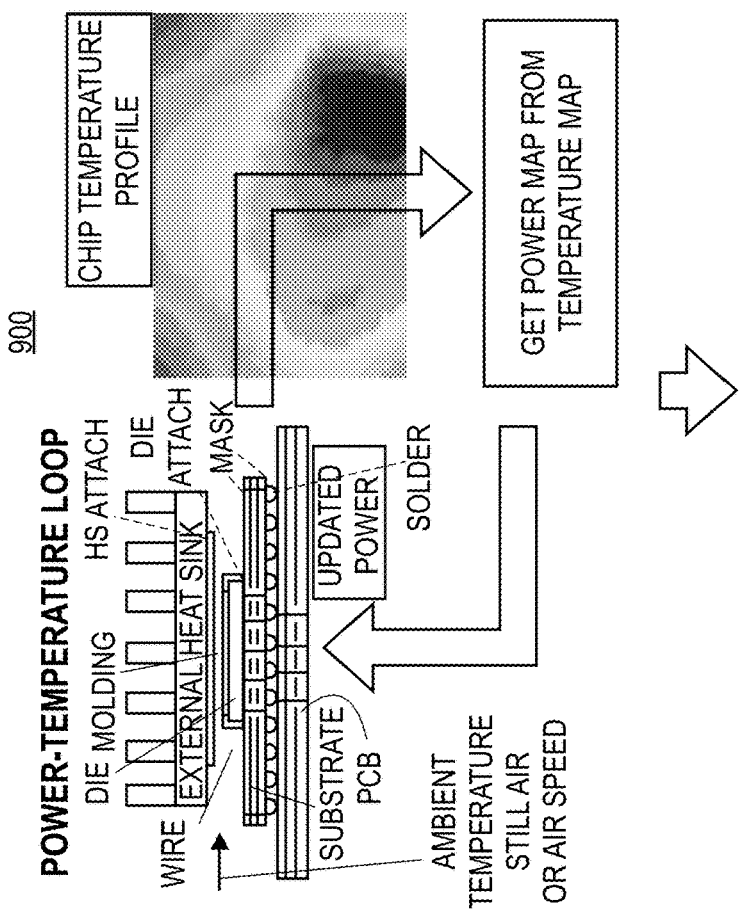

FIG. 9 shows an example how the trained temperature rise predictor can be used with a system thermal tool for a power-thermal convergence loop process 900. The power-thermal convergence loop process 900 can include an operation 902 of generating a power map by the system thermal tool for all tiles on a IC having a coarse mesh based on initial guess of a temperature for all tiles on IC. As shown in block 904, the generated power map of all the tiles on the IC can be used as an input to the trained predictor to predict the temperature rise of a tile on the IC. In block 906, the trained temperature predictor can be used to predict the temperature rise of a tile on the IC. In block 908, the temperature rise of the tile on the IC can be appended to the temperature profile of the tile on the IC to update the temperature profile. As a result, the updated temperature profile can be used to update the generated power map. The updated power map can be used as an input to the trained temperature rise predictor to predict the temperature rise of a subsequent tile on the IC. The process can be iterated to determine, using the trained neural network model, a subsequent temperature rise of the given tile on the IC based on the generated power map of the IC.

In another embodiment, the trained temperature rise predictor can be used with a system thermal tool for a power-thermal convergence loop process 900. The power-thermal convergence loop process 900 can include an operation generating a base coarse-mesh temperature profile (T1) of the IC by a system thermal tool based on an initial temperature (T0 uniformly) and the corresponding temperature-dependent power map (P0) of the IC.

In one embodiment, in response to the generating the base temperature profile of the IC, the corresponding temperature-dependent power map of the IC can be updated by the system thermal tool.

In one embodiment, the temperature-dependent power map (P0) can be used as an input to the system thermal tool and can be generated from an IC power tool. The temperature-dependent power map (P0) has been updated to a consistent power map (P1) by the system thermal tool when calculating the base temperature profile on the IC.

In one embodiment, a temperature rise of the given tile on the IC based on the base coarse-mesh temperature profile (T1) and the consistent power map (P1) of the IC can be determined using the retrieved trained neural network.

In one embodiment, a temperature rise of the given tile on the IC can be determined using the retrieved trained neural network model based on the updated corresponding temperature-dependent power of the IC.

In some embodiments, the determined temperature rise of the given tile can be appended to the generated base temperature profile (T1) having a coarse mesh to update the temperature profile of the IC to an updated temperature profile of the IC (T2).

In one embodiment, the generated power map of the IC can be updated to an updated power map (P2) based on the updated generated base temperature profile of the IC (T2).

In one embodiment, a subsequent temperature rise of the given tile on the IC can be determined using the trained neural network model based on the updated generated power map of the IC (P2). The subsequent temperature profile update can be the sum of the new temperature rise and the base coarse-mesh temperature profile (T1) of the IC. The iteration can be continued until the temperature rise on the tiles remains unchanged.

Referring to FIG. 9 again, in one embodiment, a convergence loop based on coarse mesh on the IC can be iterated to obtain a converged power level for each tile on the IC and a converged thermal profile for each tile on the IC. For a given IC or package, a power density (PD) of each tile can also be a function of tile temperature. Power-Thermal convergence can be obtained from a system analysis which uses coarse mesh to simulate the IC. The iterative solving procedure can converge after two or three iterations.

In one embodiment, a temperature rise of the given tile on an integrated circuit (IC) having a location relative to the predetermined template location can be determined using the retrieved neural network model. The plurality of inputs to the neural network model can include: (1) the selected relationship between a change in temperature relative to the power applied to the IC in the thermal simulations, (2) the selected predetermined location of the template, and (3) the selected pattern of the converged power level for the template. As a result, the converged thermal profile can be enhanced with the trained temperature rise predictor. The trained neural network can be used as post-processing step for a thermal profile resolution enhancement for the IC. In one embodiment, the thermal simulations can include computational fluid dynamics (CFD) or Finite Element (FE) simulations.

Figure 6:
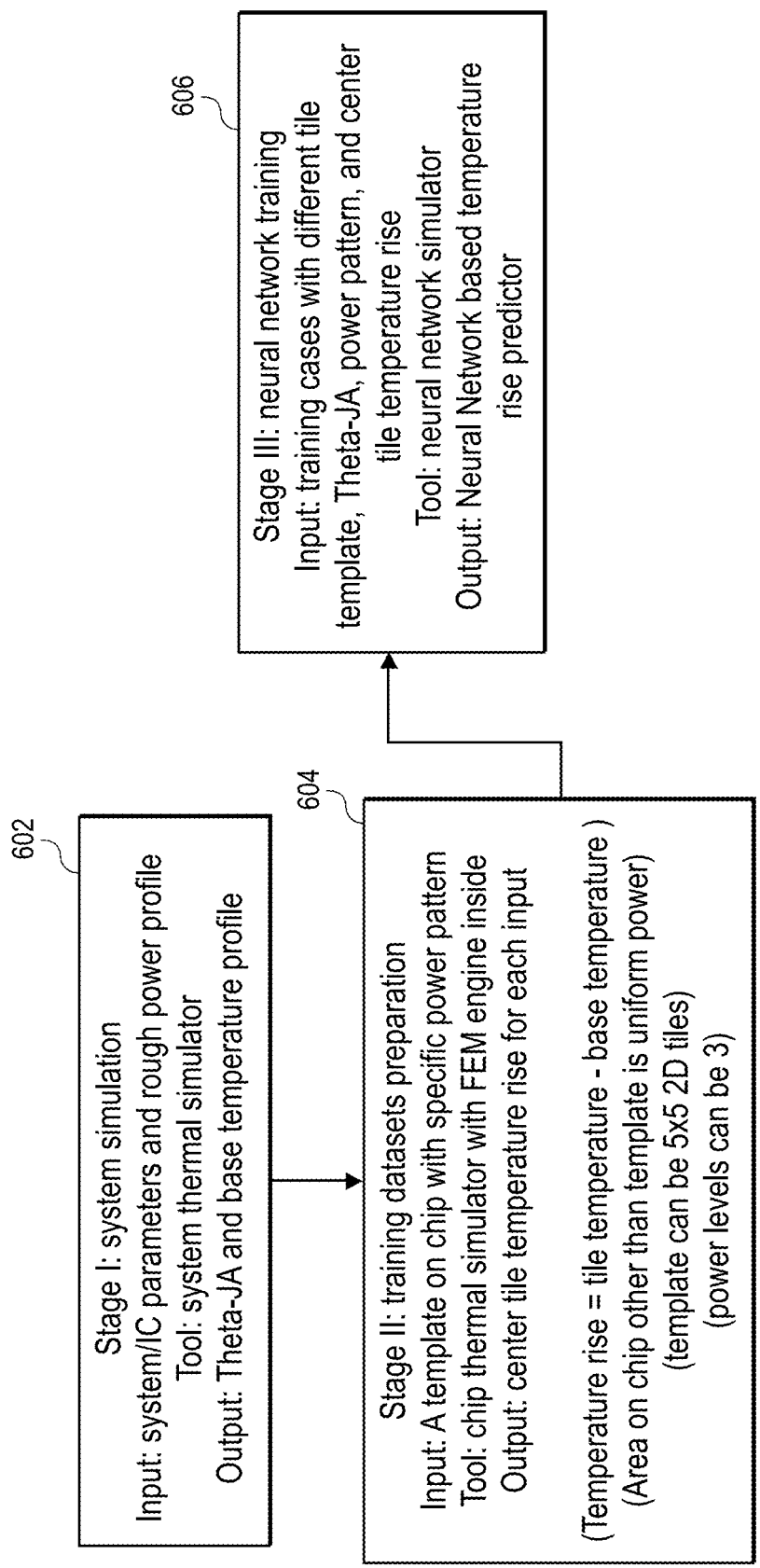
FIG. 6 is a flowchart which illustrates a method that can be employed to prepare and generate training data for use in training a predictor according to one embodiment.

FIG. 6 shows an exemplary process that can used to generate training data. This training data can be used to train a temperature rise predictor in one or more embodiments described herein. Block 602 shows an embodiment of a system simulation in this exemplary process. In system simulation, system and IC parameter as well as a rough power profile can be used as an input. In one embodiment, the system or IC parameters can include boundary condition (like HTC or ambient temperature) of IC-package, package size and substrate layer, number of leads (solder joints), IC size, substrate thicknesses, metal densities of the IC, and thermal conductivity of silicon. The system simulation can be performed using a system thermal simulator. Theta-JA and a base temperature profile can be generated as an output. The model can have a corresponding range of Theta-JA values and a uniform power on IC. In one embodiment, the number of Theta-JA values can be 5 and range from 10 to 150 C/W. Each model can be used in subsequent operations to prepare training data.

In one embodiment, block 604 shows when a training dataset can be prepared. The input can include a template having a specific power pattern. The template can include a plurality of tiles. Block 604 can be performed using a IC thermal simulator with an FEM engine.

The output generated in block 604 can include a center tile temperature rise for each input to the IC thermal simulator with FEM engine. The temperature rise can be defined as a difference between a tile temperature and the base temperature.

In some embodiments, for example, block 606 shows stage three in which a neural network can be trained. The input may include training dataset with different template, Theta-JA, power pattern, and a center tile temperature rise. Block 604 can be performed using a neural network simulator. The output in block 604 can include a trained temperature rise predictor. The IC or package or PCB model can be generated during a system simulation. The uniform power can be used to determine a base temperature profile of the IC model.

Figure 10:
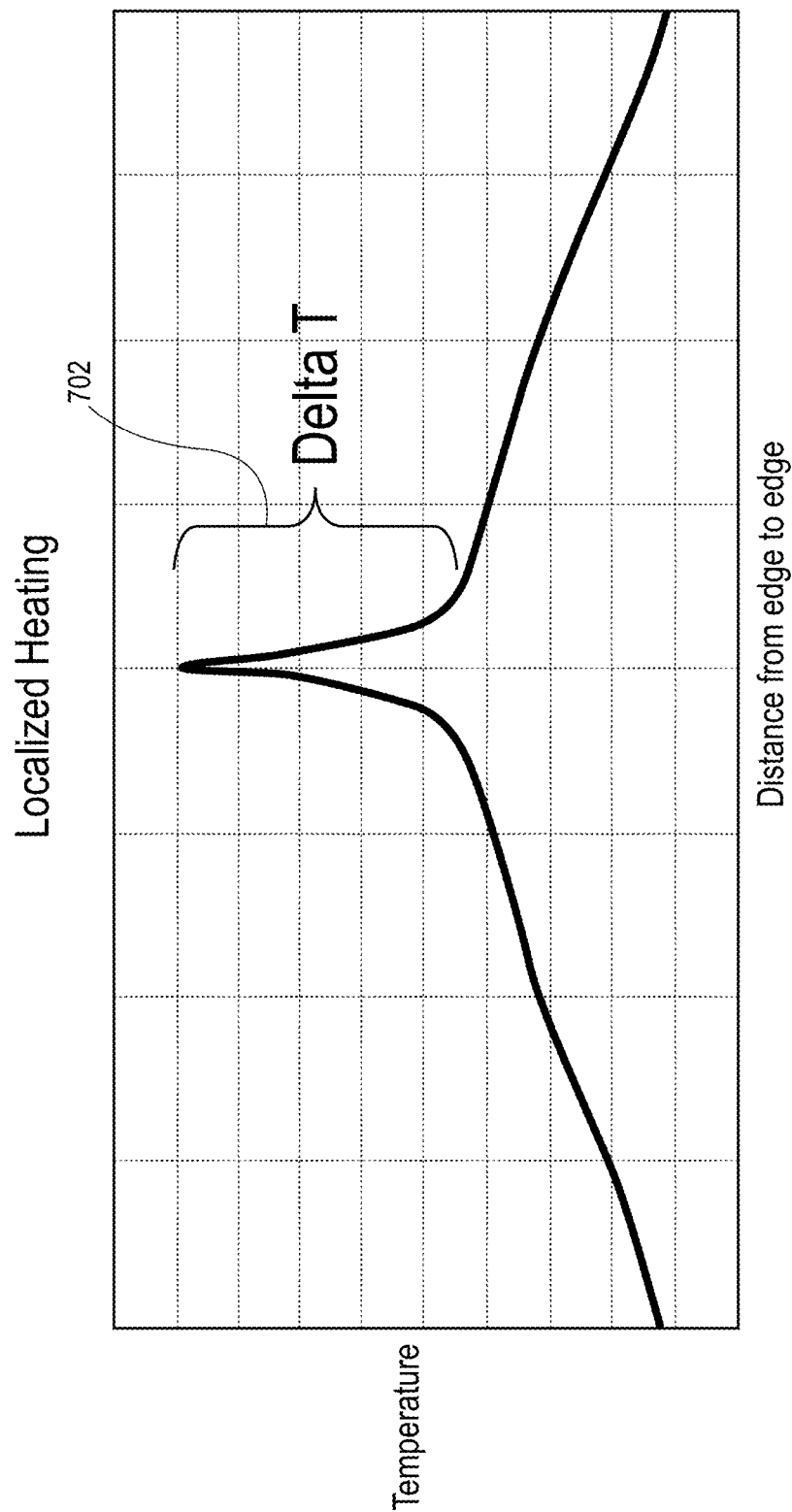
FIG. 10 shows a temperature rise at a center of an IC due to localized heating according to one embodiment.

FIG. 10 shows the thermal response plotted along a path through the $T_{max}$ location, for example at the center, of the IC after adding a local heating zone, for example, 10 µm tile, at the $T_{max}$ location, with a higher power density in addition to the uniform power across the IC, to extract the temperature rise on the IC. The temperature rise can be defined as DeltaT 702. The DeltaT 702 derived at the center of the IC can be applied to any locations inside a different IC because it can be considered a local effect. The mesh on the IC used in FIG. 10 can be defined at the location of the localized heating, for example, at the center of the IC in this example, to capture the local heating accurately. In this manner, only one model with localized heating effect and the resulting DeltaT is needed when scaled by the local power in the full power map applicable to many locations considered "inside" the IC. Similarly, the localized heating effect at the border (or edge) and corner of an IC can be extracted to represent the regions that may not be considered "inside" the IC. For a general system, the DeltaT map can be constructed given the detailed power map on a IC, by applying one localized heating at a time, at fine resolution for an IC with any size. However, in this example, the thermal couplings from the neighboring tiles, such as in the case of a power pattern in a 5×5 tile template, may not be accounted for. Hence, instead of using only one tile, a template having a group of tiles can be used to extract DeltaT.

FIG. 11A shows an example of a thermal profile resolution enhancement flow during training of the temperature rise predictor. Diagram 1108 shows a thermal profile for an IC with a specific Theta-JA having a uniform power. Diagram 1110 shows a thermal profile having a local temperature rise or DeltaT 1104 that can be obtained due to the local heating effect near a center of the IC. Similarly, diagram 1112 shows a DeltaT 1106 can be obtained due to a local heating effect near the border of the IC. A trained temperature rise predictor can be generated using the training dataset.

Figure 11B:
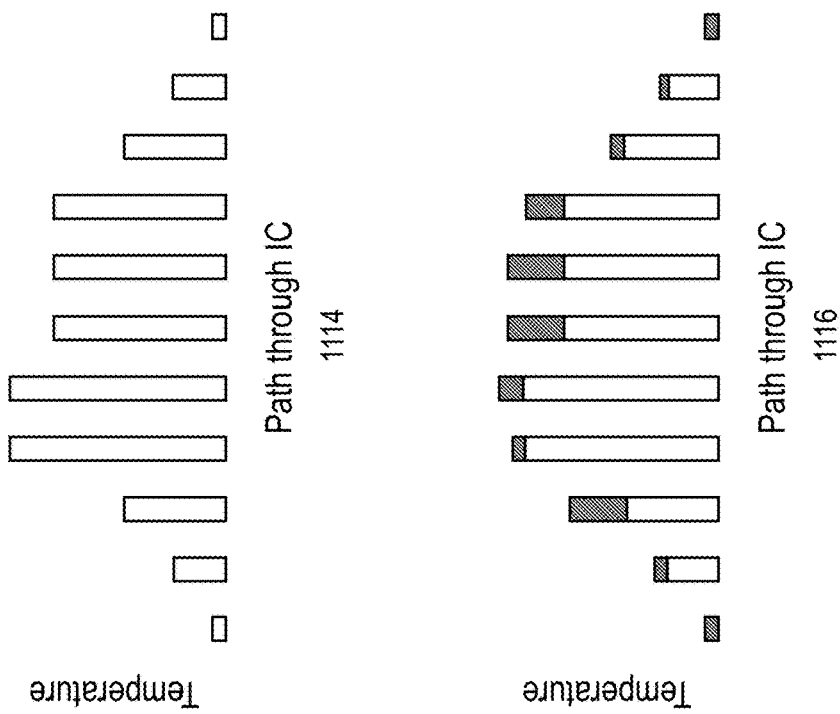
FIG. 11B shows a DNN training and prediction flow for a higher resolution thermal profile according to one embodiment.
Figure 11B:
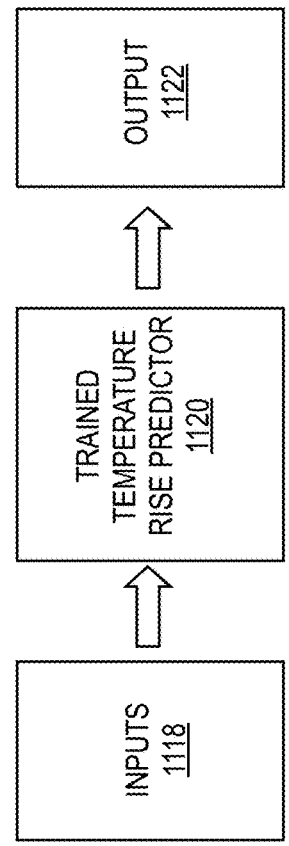

In one embodiment as illustrated in FIG. 11B, the trained temperature rise predictor 504 with a plurality of inputs 1118 can be used to generate an output of a DeltaT map 1122 throughout the IC area as shown in diagram 1116. As further illustrated in FIG. 11B, the combination of the system thermal profile in diagram 1114 of an IC and the generated DeltaT map 1122 obtained from applying the trained predictor on each tile on the IC can generate a final thermal profile with an enhanced resolution as shown in diagram 1116. Diagram 1116 shows the DeltaT map determined using the trained temperature rise predictor that has been appended to the system thermal profile 1114.

Figure 12:
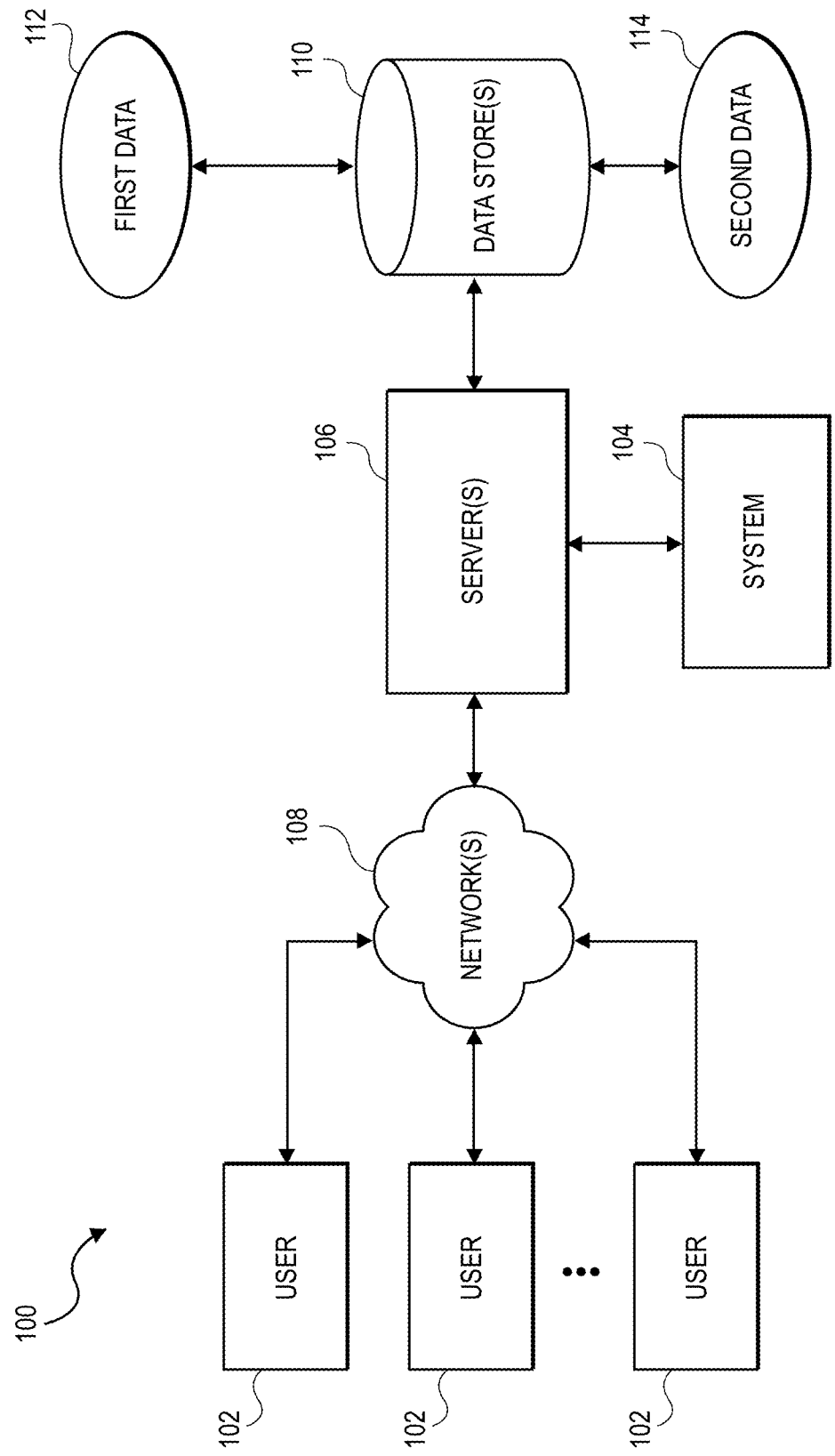
FIGS. 12, 13A-13C depict example systems which may be used in conjunction with the embodiments described herein.

FIG. 12 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

FIGS. 13A, 13B, and 13C depict example systems for use in implementing a system. The data processing system shown in FIGS. 12-13C can be used to train a temperature rise predictor, and the same data processing system can be used to determine a thermal behavior of a given tile on an integrated circuit (IC) using the trained predictor. As another example, the data processing system shown in FIGS. 12-13C can be used after a predictor has been trained by another system to determine a thermal behavior of a given tile on an integrated circuit (IC) using the trained predictor.

For example, FIG. 13A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 13B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 13C shows a block diagram of exemplary hardware for a standalone computer architecture 250, such as the architecture depicted in FIG. 13A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
   retrieving from memory, a trained neural network model, the neural network model having been trained with a plurality of inputs and an output derived from thermal simulations, the plurality of inputs comprising a relationship between a change in temperature relative to power, a predetermined template location, and a pattern of a plurality of predefined power levels in tiles associated with the template; and
   determining, using the retrieved trained neural network model, a change in a temperature of a given tile on an integrated circuit (IC) having a location relative to the predetermined template location, a plurality of inputs to the neural network model including: (1) a selected relationship between a change in temperature relative to a power applied to the IC in the thermal simulations, (2) a selected predetermined location of the template, and (3) a selected pattern of a predefined power level for the template.

2. The non-transitory machine readable medium as in claim 1, wherein the determining is repeated for each tile on the IC using the retrieved trained neural network model.

3. The non-transitory machine readable medium as in claim 1, wherein the thermal simulations include computational fluid dynamics (CFD) simulations and finite elements (FE) simulations.

4. The non-transitory machine readable medium as in claim 1, the method further comprising:
   appending a temperature rise map based on the change in the temperature of the given tile to the IC system thermal profile to generate a detailed thermal profile for the IC.

5. The non-transitory machine readable medium as in claim 1, the method further comprising:
   generating a base temperature profile of the IC having a coarse mesh by a system thermal tool based on an initial temperature and a corresponding temperature-dependent power map of the IC;
   in response to the generating the base temperature profile of the IC, updating the corresponding temperature-dependent power map of the IC by the system thermal tool;
   determining, using the retrieved trained neural network model, a temperature rise of the given tile on the IC based on the updated corresponding temperature-dependent power of the IC;
   appending the determined temperature rise of the given tile to the generated base temperature profile of the IC to update the generated base temperature profile of the IC;
   updating the generated power map of the IC based on the updated generated base temperature profile of the IC; and
   determining, using the retrieved trained neural network model, a subsequent temperature rise of the given tile on the IC based on the updated generated power map of the IC.

6. The non-transitory machine readable medium as in claim 1, the method further comprising:
   iterating a convergence loop based on coarse mesh on the IC to obtain a converged power level for each tile on the IC and a converged thermal profile for each tile on the IC; and determining, using the retrieved neural network model, a temperature rise of the given tile on an IC having a location relative to the predetermined template location, the plurality of inputs to the neural network model including: (1) the selected relationship between a change in temperature relative to the power applied to the IC in the thermal simulations, (2) the selected predetermined location of the template, and (3) the selected pattern of the converged power level for the template.

7. The non-transitory machine readable medium as in claim 1, wherein the neural network model is a deep neural network (DNN) model.

8. A machine implemented method, the method comprising:
retrieving from memory, a trained neural network model, the neural network model having been trained with a plurality of inputs and an output derived from thermal simulations, the plurality of inputs comprising a relationship between a change in temperature relative to power, a predetermined template location, and a pattern of a plurality of predefined power levels in tiles associated with the template; and
determining, using the retrieved trained neural network model, a change in a temperature of a given tile on an integrated circuit (IC) having a location relative to the predetermined template location, a plurality of inputs to the neural network model including: (1) a selected relationship between a change in temperature relative to a power applied to the IC in the thermal simulations, (2) a selected predetermined location of the template, and (3) a selected pattern of a predefined power level for the template.

9. The method as in claim 8, wherein the determining is repeated for each tile on the IC using the retrieved trained neural network model.

10. The method as in claim 8, wherein the thermal simulations include computational fluid dynamics (CFD) simulations and finite elements (FE) simulations.

11. The method as in claim 8, the method further comprising:
appending a temperature rise map based on the change in the temperature of the given tile to the IC system thermal profile to generate a detailed thermal profile for the IC.

12. The method as in claim 8, the method further comprising:
generating a base temperature profile of the IC having a coarse mesh by a system thermal tool based on an initial temperature and a corresponding temperature-dependent power map of the IC;
in response to the generating the base temperature profile of the IC, updating the corresponding temperature-dependent power map of the IC by the system thermal tool;
determining, using the retrieved trained neural network model, a temperature rise of the given tile on the IC based on the updated corresponding temperature-dependent power of the IC;
appending the determined temperature rise of the given tile to the generated base temperature profile of the IC to update the generated base temperature profile of the IC;
updating the generated power map of the IC based on the updated generated base temperature profile of the IC; and
determining, using the retrieved trained neural network model, a subsequent temperature rise of the given tile on the IC based on the updated generated power map of the IC.

13. The method as in claim 8, the method further comprising:
iterating a convergence loop based on coarse mesh on the IC to obtain a converged power level for each tile on the IC and a converged thermal profile for each tile on the IC; and
determining, using the retrieved neural network model, a temperature rise of the given tile on an IC having a location relative to the predetermined template location, the plurality of inputs to the neural network model including: (1) the selected relationship between a change in temperature relative to the power applied to the IC in the thermal simulations, (2) the selected predetermined location of the template, and (3) the selected pattern of the converged power level for the template.

14. The method as in claim 8, wherein the neural network model is a deep neural network (DNN) model.

* * * * *